US012565044B2

(12) United States Patent
Nawa et al.

(10) Patent No.: US 12,565,044 B2
(45) Date of Patent: Mar. 3, 2026

(54) LIQUID EJECTING APPARATUS

(71) Applicant: SEIKO EPSON CORPORATION, Tokyo (JP)

(72) Inventors: Kento Nawa, Shiojiri (JP); Shigeki Suzuki, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 186 days.

(21) Appl. No.: 18/428,301

(22) Filed: Jan. 31, 2024

(65) Prior Publication Data

US 2024/0253357 A1 Aug. 1, 2024

(30) Foreign Application Priority Data

Feb. 1, 2023 (JP) ................................ 2023-013821

(51) Int. Cl.
*B41J 2/165* (2006.01)
*B41J 2/045* (2006.01)

(52) U.S. Cl.
CPC ....... *B41J 2/16532* (2013.01); *B41J 2/04581* (2013.01); *B41J 2/16505* (2013.01); *B41J 2/16508* (2013.01); *B41J 2/16523* (2013.01); *B41J 2/16535* (2013.01); *B41J 2/1652* (2013.01); *B41J 2002/16573* (2013.01)

(58) Field of Classification Search
CPC ................ B41J 2/16532; B41J 2/04581; B41J 2/16505; B41J 2/16508; B41J 2/16523; B41J 2/16535; B41J 2/1652; B41J 2002/16573; B41J 2202/19; B41J 2202/20; B41J 2/14233; B41J 2/18; B41J 2/01; B41J 2/07; B41J 2/14201; B41J 29/393
See application file for complete search history.

(56) References Cited

U.S. PATENT DOCUMENTS

2019/0077163 A1 3/2019 Sato et al.

FOREIGN PATENT DOCUMENTS

| | | | | |
|---|---|---|---|---|
| JP | 2007083706 A | * | 4/2007 | .......... B41J 2/16511 |
| JP | 2019-051614 A | | 4/2019 | |
| JP | 2020-082412 A | | 6/2020 | |

* cited by examiner

*Primary Examiner* — Justin Seo
(74) *Attorney, Agent, or Firm* — Harness, Dickey & Pierce, P.L.C.

(57) ABSTRACT

There is provided a liquid ejecting apparatus including: a liquid ejecting head having an ejection surface provided with nozzle arrays and configured to execute a printing operation; a liquid storage section; and a control section configured to execute the printing operation, in which the nozzle arrays include a first nozzle array and a second nozzle array, when the liquid storage section is not coupled to the first nozzle array and is coupled to the second nozzle array, the control section is configured to execute a first mode in which the second nozzle array is used without using the first nozzle array for the printing operation, and when the first mode is executable, the control section executes a sequence including cleaning in which a liquid entering the first nozzle array is discharged from the first nozzle array.

16 Claims, 13 Drawing Sheets

LIQUID EJECTING APPARATUS

The present application is based on, and claims priority from JP Application Serial Number 2023-013821, filed Feb. 1, 2023, the disclosure of which is hereby incorporated by reference herein in its entirety.

BACKGROUND

1. Technical Field

The present disclosure relates to a liquid ejecting apparatus.

2. Related Art

A liquid ejecting head provided in a liquid ejecting apparatus represented by an ink jet type printer generally includes a plurality of nozzle arrays that eject a liquid such as ink. JP-A-2020-82412 discloses a liquid ejecting head including a dummy pressure chamber and a dummy flow path which do not communicate with a nozzle in addition to a pressure chamber and a flow path which communicate with a nozzle.

There is a demand to use only some of the nozzle arrays among the plurality of nozzle arrays included in the liquid ejecting head for a printing operation. This is because there is a case where the manufacturing cost can be suppressed by using only a necessary nozzle array of an existing head rather than manufacturing a new head having the reduced number of nozzle arrays. However, when only some of nozzle arrays among the plurality of nozzles included in the liquid ejecting head are used, there is a concern that ink enters the nozzle arrays that are not used, the ink falls at an unexpected timing, and the medium is contaminated.

Therefore, as disclosed in JP-A-2020-82412, it is conceivable to close unused nozzle arrays that are not used. However, in this case, there is a problem that, in order to provide liquid ejecting apparatuses to a user who desires to use all nozzle arrays of the liquid ejecting head and a user who desires to use only some of the nozzle arrays of the liquid ejecting head, respectively, a liquid ejecting apparatus including a liquid ejecting head that closes the unused nozzle array and a liquid ejecting apparatus including a liquid ejecting head that does not include a closed nozzle array, that is, that can use all nozzle arrays are manufactured separately, and these liquid ejecting apparatuses are separately managed in inventory.

SUMMARY

According to an aspect of the present disclosure, there is provided a liquid ejecting apparatus including: a liquid ejecting head having an ejection surface provided with a plurality of nozzle arrays and configured to execute a printing operation of ejecting a liquid toward a medium; a liquid storage section that stores a liquid to be supplied to the liquid ejecting head; and a control section configured to execute the printing operation, in which the plurality of nozzle arrays include a first nozzle array and a second nozzle array, when the liquid storage section is not coupled to the first nozzle array and is coupled to the second nozzle array, the control section is configured to execute a first mode in which the second nozzle array is used without using the first nozzle array for the printing operation, and when the first mode is executable, the control section executes a sequence including cleaning in which a liquid entering the first nozzle array is discharged from the first nozzle array.

DESCRIPTION OF EMBODIMENTS

Figure 1:
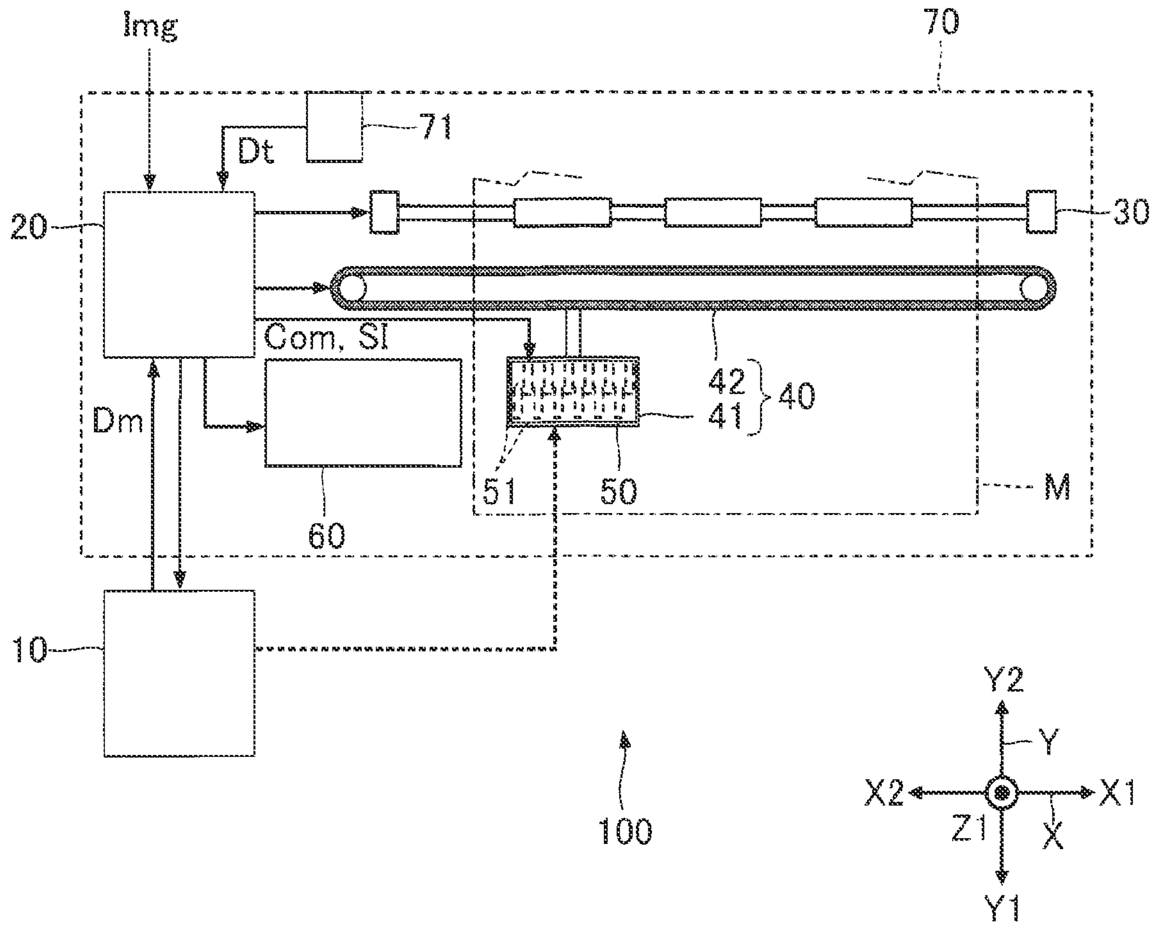
FIG. 1 is a schematic view illustrating a configuration example of a liquid ejecting apparatus according to an embodiment.

Hereinafter, preferred embodiments according to the present disclosure will be described with reference to the attached drawings. In the drawings, the dimensions and scale of each section may differ from the actual ones, and some parts are schematically illustrated for ease of understanding. Further, the scope of the present disclosure is not limited to these aspects unless otherwise stated to limit the disclosure in the following description.

Hereinafter, for convenience of description, an X-axis, a Y-axis and a Z-axis which intersect each other are appropriately used. In addition, hereinafter, one direction along the X-axis is an X1 direction, and a direction opposite to the X1 direction is an X2 direction. Similarly, the directions opposite to each other along the Y-axis are a Y1 direction and a Y2 direction. In addition, the directions opposite to each other along the Z-axis are a Z1 direction and a Z2 direction.

Here, typically, the Z-axis is a vertical axis, and the Z2 direction corresponds to a downward direction in the vertical direction. However, the Z-axis may not be the vertical axis. In addition, the X-axis, the Y-axis, and the Z-axis are typically orthogonal to each other, but are not limited thereto, and may intersect each other at an angle within the range of 800 or more and 1000 or less, for example.

1. Embodiment

1-1. Schematic Configuration of Liquid Ejecting Apparatus

FIG. 1 is a schematic view illustrating a configuration example of a liquid ejecting apparatus 100 according to an embodiment. The liquid ejecting apparatus 100 is an ink jet type printing apparatus that ejects ink, which is an example of a "liquid," onto a medium M as a droplet. The medium M is, for example, printing paper. The medium M is not limited to printing paper, and may be a printing target of any material such as a resin film or cloth.

As illustrated in FIG. 1, the liquid ejecting apparatus 100 includes a liquid supply mechanism 10, a control unit 20, a transport mechanism 30, a movement mechanism 40, a liquid ejecting head 50, a maintenance mechanism 60, and a housing 70. Hereinafter, all of these will be briefly described in order with reference to FIG. 1.

The liquid supply mechanism 10 is a mechanism that supplies the ink to the liquid ejecting head 50. Although not illustrated in FIG. 1, the liquid supply mechanism 10 has at least one liquid storage section 11 that stores ink and pressure-feeds the ink from the liquid storage section 11 toward the liquid ejecting head 50. In addition, the liquid supply mechanism 10 can attach and detach the liquid storage section 11, and outputs a detection signal Dm indicating the mounting state of the liquid storage section 11. Furthermore, the liquid supply mechanism 10 has a mechanism that forcibly opens a pressure regulating valve 54, which will be described later, at a desired time. Details of the liquid supply mechanism 10 will be described later with reference to FIG. 3.

The control unit 20 controls the operation of each element of the liquid ejecting apparatus 100. Here, the control unit 20 outputs a drive signal Com for driving the liquid ejecting head 50 and a control signal SI for controlling the drive of the liquid ejecting head 50. The control signal SI is a signal for designating whether or not to supply the drive signal Com to a drive element 51*f* (to be described later) of the liquid ejecting head 50, and is generated based on print data Img. The print data Img is information indicating an image, and is supplied to the control unit 20 from a host computer such as a personal computer or a digital camera.

The control unit 20 switchably executes a plurality of modes including a first mode MD1 and a second mode MD2 in which printing operations are different from each other based on the detection signal Dm from the mounting section 12. The first mode MD1 is a mode in which only some of a plurality of nozzle arrays LN included in the liquid ejecting head 50 can be used for the printing operation. The second mode MD2 is a mode in which all of the nozzle arrays LN included in the liquid ejecting head 50 can be used for the printing operation. The control unit 20 refers to count information Dc performed by a counting section 21*b* (to be described later) based on a measurement signal Dt indicating a temperature measured by a temperature sensor 71 (to be described later). The details of the control unit 20 will be described later with reference to FIG. 2.

The transport mechanism 30 transports the medium M in the Y1 direction under the control of the control unit 20. The movement mechanism 40 causes the plurality of the liquid ejecting heads 50 to reciprocate in the X1 direction and the X2 direction under the control of the control unit 20. In an example illustrated in FIG. 1, the movement mechanism 40 includes a substantially box-shaped transport body 41 called a carriage for accommodating the liquid ejecting head 50, and a transport belt 42 to which the transport body 41 is fixed. In addition to the plurality of liquid ejecting heads 50, the transport body 41 may be equipped with a part of the liquid supply mechanism 10, for example, the liquid storage section 11, which will be described later.

Under the control of the control unit 20, the liquid ejecting head 50 ejects the ink supplied from the liquid supply mechanism 10 onto the medium M in the Z2 direction from each of a plurality of nozzles N. The ink is ejected concurrently when the medium M is transported by the transport mechanism 30 and the liquid ejecting head 50 is caused to reciprocate by the movement mechanism 40. In this manner, an image is formed on a surface of the medium M by using the ink. Further, the movement mechanism 40 disposes the liquid ejecting head 50 at a position deviated from the transport region of the medium M in the width direction.

In the example illustrated in FIG. 1, the liquid ejecting head 50 has a plurality of head chips 51 each having a plurality of nozzles N for ejecting ink. Each of the plurality of head chips 51 is coupled to the liquid supply mechanism 10 via a supply path formed of a pipe body and the like (not illustrated). Details of the head chip 51 will be described later with reference to FIG. 3. The number of the head chips 51 included in the liquid ejecting head 50 is not limited to the example illustrated in FIG. 1. The number may be selected in any desired way, and may be a single number.

The maintenance mechanism 60 is a mechanism for performing maintenance of the liquid ejecting head 50. The maintenance mechanism 60 according to the present embodiment has a function of executing suction cleaning in which ink is discharged from the nozzle N of the liquid ejecting head 50 by suction, a function of executing a wiping operation of wiping an ejection surface FN (to be described later) of the liquid ejecting head 50, and a function of executing capping of capping all of the nozzles N of the liquid ejecting head 50. In the example illustrated in FIG. 1, the maintenance mechanism 60 is disposed at a position deviated from the transport path of the medium M in the width direction (X2 direction) of the medium M. For example, the deviated position is one end point of the reciprocating movement of the liquid ejecting head 50, and is also referred to as a home position. Details of the maintenance mechanism 60 will be described later with reference to FIG. 5.

The housing 70 is a box that accommodates at least the liquid ejecting head 50 among the components of the liquid ejecting apparatus 100. In the example illustrated in FIG. 1, the housing 70 accommodates the components other than the liquid supply mechanism 10 among the components of the liquid ejecting apparatus 100. The housing 70 may not accommodate the components other than the liquid ejecting head 50 among the components of the liquid ejecting apparatus 100, or may accommodate at least a part of the liquid supply mechanism 10. Further, the housing 70 is provided with the temperature sensor 71 such as a thermistor that measures a temperature inside the housing 70. The temperature sensor 71 outputs a measurement signal Dt indicating the measured temperature inside the housing 70. An installation position of the temperature sensor 71 is not limited to the example illustrated in FIG. 1 as long as the temperature inside the housing 70 can be measured.

1-2. Electrical Configuration of Liquid Ejecting Apparatus

Figure 2:
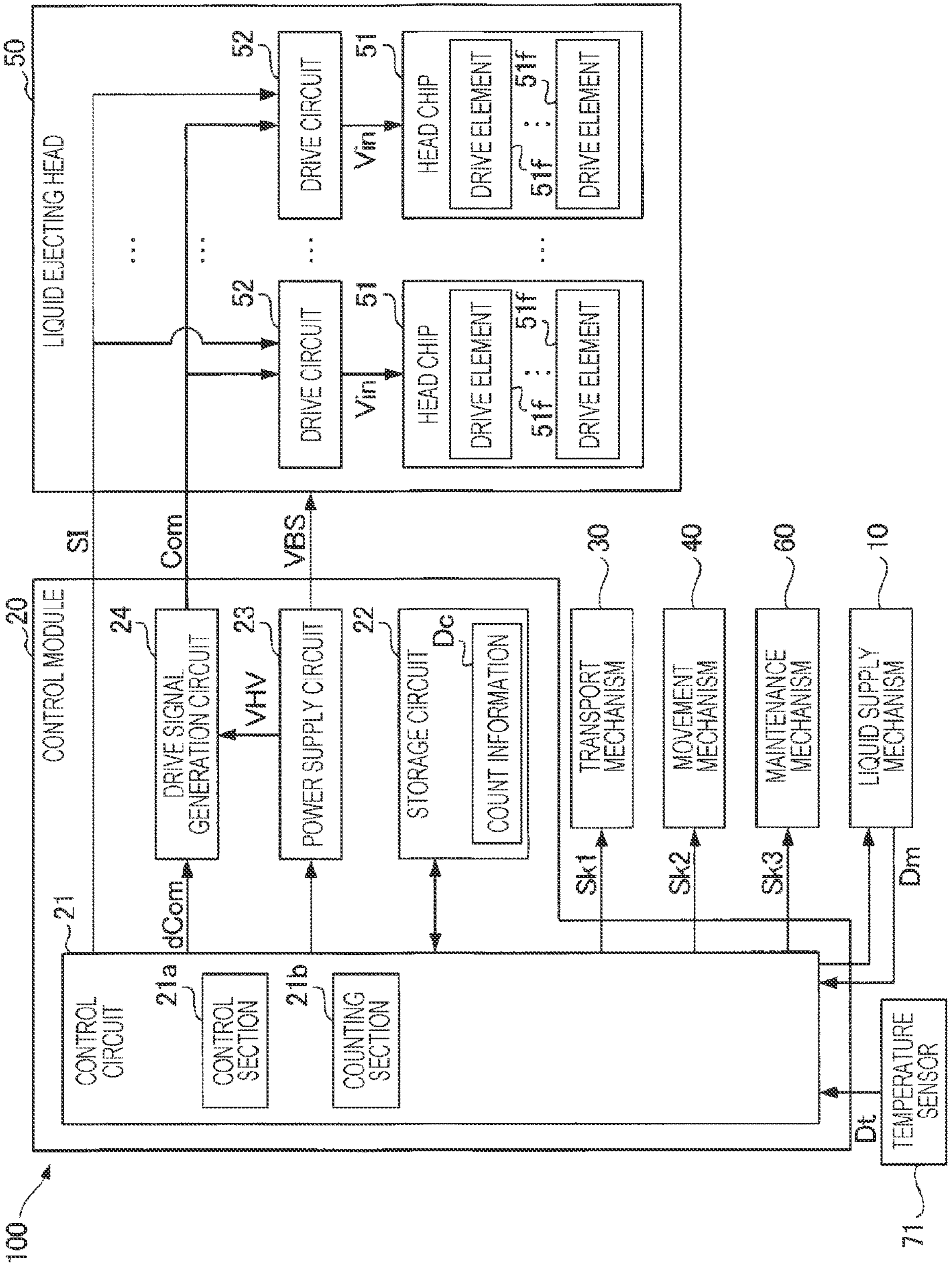
FIG. 2 is a block diagram illustrating an electrical configuration of the liquid ejecting apparatus according to the embodiment.

FIG. 2 is a block diagram illustrating an electrical configuration of the liquid ejecting apparatus 100 according to the embodiment. As illustrated in FIG. 2, the liquid ejecting head 50 includes a plurality of head chips 51 and a plurality of drive circuits 52.

Each of the plurality of head chips 51 includes a plurality of drive elements 51*f*. Each of the plurality of drive elements 51*f* included in the head chip 51 according to the present embodiment is a piezoelectric element, and is driven by an inverse piezoelectric effect supplied with a supply drive signal Vin. Details of the head chip 51 will be described later with reference to FIG. 3. Each of the plurality of head chips 51 has the same structure.

The drive circuits 52 are provided for each head chip 51 corresponding to the plurality of head chips 51, and drive the drive element 51*f* of the corresponding head chip 51 under the control of the control unit 20. Specifically, under the control of the control unit 20, the drive circuit 52 switches whether or not to supply the drive signal Com output from the control unit 20 as the supply drive signal Vin to each of the plurality of drive elements 51*f* included in the head chip 51.

As illustrated in FIG. 2, the control unit 20 includes a control circuit 21, a storage circuit 22, a power supply circuit 23, and a drive signal generation circuit 24.

The control circuit 21 has a function of controlling the operation of each section of the liquid ejecting apparatus 100 and a function of processing various types of data.

The control circuit 21 includes, for example, one or more processors such as a central processing unit (CPU). The control circuit 21 may include a programmable logic device such as a field-programmable gate array (FPGA) in place of the CPU or in addition to the CPU. In addition, when the control circuit 21 is configured to include a plurality of processors, the plurality of processors may be mounted on different substrates or the like.

The storage circuit 22 stores various programs executed by the control circuit 21 and various data such as the print data Img processed by the control circuit 21. The storage circuit 22 includes, for example, a semiconductor memory of one or both of volatile memories such as a random access memory (PAM) and non-volatile memories such as a read only memory (ROM), an electrically erasable programmable read-only memory (EEPROM) or a programmable ROM (PROM). A part or the entirety of the storage circuit 22 may be configured as a part of the control circuit 21.

The count information Dc is stored in the storage circuit 22. The count information Dc is information indicating the number of shots, which is the number of times of discharging ink from the liquid ejecting head 50. The number of shots is updated by the counting section 21*b* (to be described later), and reset every predetermined number of times. The number of shots may be the number of times of discharge for each nozzle N or each group of the predetermined number of nozzles N, or may be the number of times of discharge for each nozzle array LN or each group of the predetermined number of nozzle arrays LN.

The power supply circuit 23 is supplied with power from a commercial power supply (not illustrated) and generates various predetermined potentials. The various potentials generated are appropriately supplied to each section of the liquid ejecting apparatus 100. For example, the power supply circuit 23 generates a power supply potential VHV and an offset potential VBS. The offset potential VBS is supplied to the liquid ejecting head 50. In addition, the power supply potential VHV is supplied to the drive signal generation circuit 24.

The drive signal generation circuit 24 is a circuit that generates the drive signal Com for driving each drive element 51*f*. Specifically, the drive signal generation circuit 24 includes, for example, a DA conversion circuit and an amplifier circuit. In the drive signal generation circuit 24, the DA conversion circuit converts a waveform designation signal dCom from the control circuit 21 from a digital signal to an analog signal, and the amplifier circuit amplifies the analog signal by using the power supply potential VHV from the power supply circuit 23 to generate the drive signal Com. Here, among the waveforms included in the drive signal Com, the signal of the waveform actually supplied to the drive element 51*f* is the above-described supply drive signal Vin. The waveform designation signal dCom is a digital signal for defining the waveform of the drive signal Com.

In the above control unit 20, the control circuit 21 controls an operation of each section of the liquid ejecting apparatus 100 by executing the program stored in the storage circuit 22. Here, by executing the program, the control circuit 21 generates a control signal Sk1, a control signal Sk2, a control signal Sk3, a control signal SI, and the waveform designation signal dCom as signals for controlling the operation of each section of the liquid ejecting apparatus 100.

The control signal Sk1 is a signal for controlling the drive of the transport mechanism 30. The control signal Sk2 is a signal for controlling the drive of the movement mechanism 40. The control signal Sk3 is a signal for controlling the drive of the maintenance mechanism 60. The control signal SI is a digital signal for designating an operating state of the drive element 51*f*. Here, the control signal SI may include a timing signal for defining a drive timing of the drive element 51*f*. The timing signal is generated, for example, based on the output of an encoder that detects the position of the transport body 41 described above.

In addition, the control circuit 21 functions as a control section 21*a* and a counting section 21*b* by executing a program stored in the storage circuit 22.

The control section 21*a* controls the printing operation and the maintenance operation. In the printing operation, the ink is ejected from the liquid ejecting head 50 toward the medium M. The maintenance operation includes one or both of suction cleaning CLS (to be described later) using the maintenance mechanism 60 and pressurization cleaning CLP (to be described later) using the liquid supply mechanism 10.

In particular, the control section 21*a* can execute a first mode MD1 in which only some of the plurality of nozzle arrays LN (to be described later) included in the liquid ejecting head 50 can be used for the printing operation. The control section 21*a* according to the present embodiment is capable of switching between the first mode MD1 and the second mode MD2 in which all of the nozzle arrays LN included in the liquid ejecting head 50 can be used for the printing operation.

Specifically, when the control section 21*a* determines, based on the detection signal Dm, that the liquid storage section 11 is coupled to only some of the plurality of nozzle arrays LN included in the liquid ejecting head 50, the first mode MD1 can be executed. Meanwhile, when the control section 21*a* determines, based on the detection signal Dm, that the liquid storage section 11 is coupled to all of the nozzle arrays LN included in the liquid ejecting head 50, the second mode MD2 can be executed. Details of the first mode MD1 and the second mode MD2 will be described later with reference to FIGS. 7 to 13.

Here, in both the first mode MD1 and the second mode MD2, the control section 21*a* can execute the maintenance operation for all of the nozzle arrays included in the liquid ejecting head 50. Therefore, the control section 21*a* also executes the maintenance operation with respect to the unused nozzle array in the first mode MD1. The sequence of the maintenance operation in the first mode MD1 is started based on the number of shots indicated by the count information Dc. Details of the sequence will be described later with reference to FIGS. 10 to 13.

The counting section 21*b* generates and updates the count information Dc. For example, the counting section 21*b* counts the number of times of discharging ink from the liquid ejecting head 50 based on a signal such as the control signal SI, generates the count information Dc indicating the counted number, and adds the counted number to the counted number indicating the count information Dc to update the count information Dc. The counting by the counting section 21*b* may be performed before the printing operation is executed, or may be performed after the printing operation is executed. Further, as will be described in detail later, the counting section 21*b* resets the counted number indicated by the count information Dc according to an instruction from the control section 21*a* every time the counted number indicated by the count information Dc reaches a predetermined number of times.

1-3. Configuration of Liquid Supply Mechanism

Figure 3:
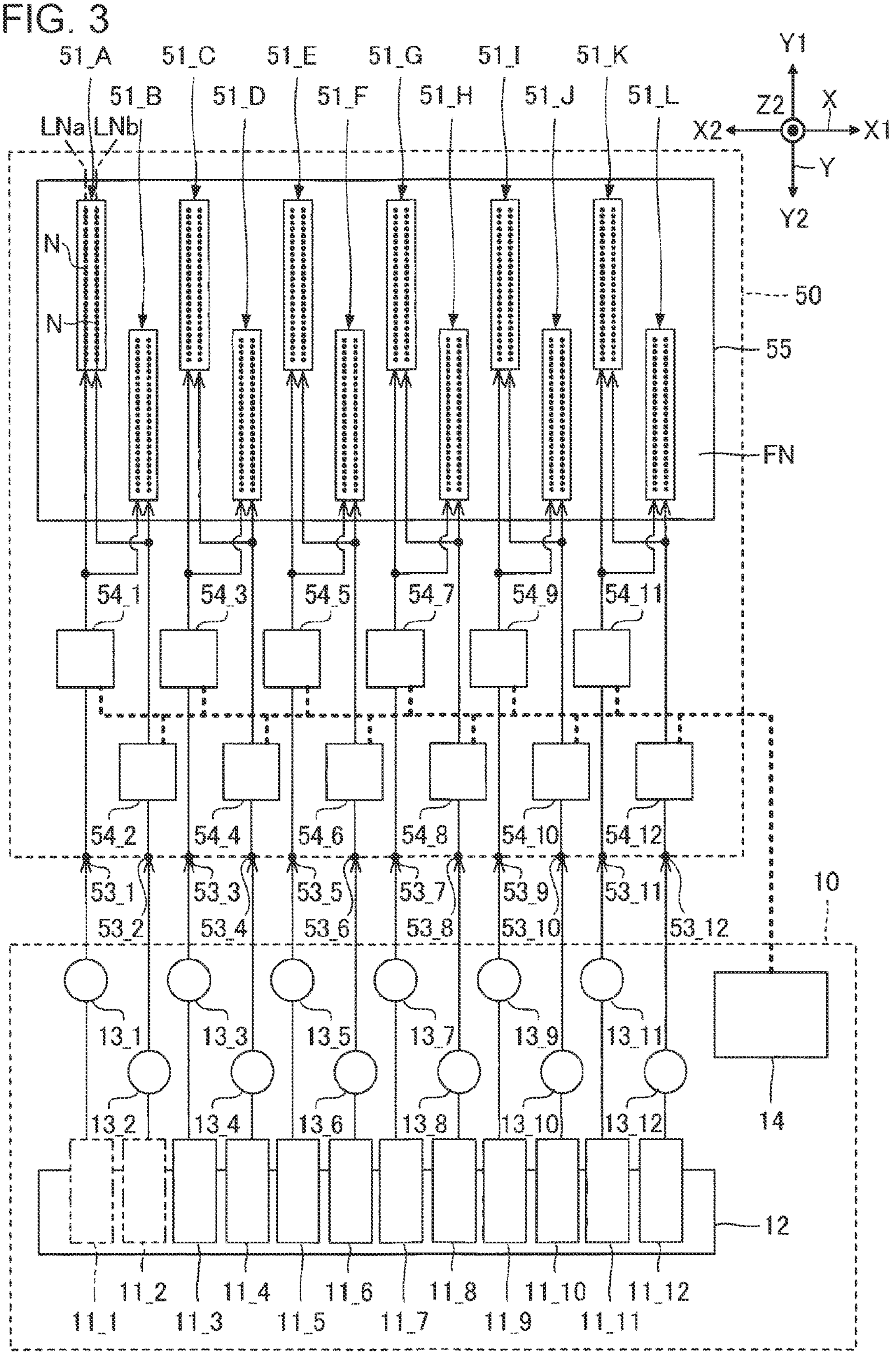
FIG. 3 is a view for describing a liquid supply mechanism.

FIG. 3 is a view for describing the liquid supply mechanism 10. FIG. 3 schematically illustrates configurations of the liquid supply mechanism 10 and the liquid ejecting head 50, and illustrates the ejection surface FN of the liquid ejecting head 50 when viewed in the Z1 direction.

First, before describing the liquid supply mechanism 10, a configuration related to a supply path of the ink in the liquid ejecting head 50 will be described with reference to FIG. 3.

As illustrated in FIG. 3, the liquid ejecting head 50 has head chips 51_A to 51_L, introduction sections 53_1 to 53_12, and pressure regulating valves 54_1 to 54_12. Each of the head chips 51_A to 51_L corresponds to the head chip 51 illustrated in FIG. 1, and each of the head chips 51_A to 51_L may be referred to as the head chip 51 below. Each of the introduction sections 53_1 to 53_12 may be referred to as an introduction section 53. Each of the pressure regulating valves 54_1 to 54_12 may be referred to as a pressure regulating valve 54.

Each of the head chips 51_A to 51_L has a plurality of nozzles N for ejecting ink. The plurality of nozzles N are divided into a nozzle array LNa and a nozzle array LNb which are disposed at intervals from each other in the direction along the X-axis. Each of the nozzle array LNa and the nozzle array LNa is a set of the plurality of nozzles N arranged in the direction along the Y-axis. Each of the nozzles N of the nozzle array LNa and the nozzle array LNa opens to the ejection surface FN, which is a surface of the liquid ejecting head 50 facing the Z2 direction. In the example illustrated in FIG. 3, in each head chip 51, the nozzle array LNa is disposed at a position in the X2 direction with respect to the nozzle array LNb. Hereinafter, each of the nozzle array LNa and the nozzle array LNb may be referred to as a nozzle array LN.

In the present embodiment, there are a case where the nozzle arrays LNa and LNb of the head chips 51_A and 51_B are used nozzle arrays used for ejecting ink and a case where the nozzle arrays are unused nozzle arrays that are not used for ejecting ink. In other words, the used nozzle array is the nozzle array LN used for the printing operation, and the unused nozzle array is the nozzle array LN that is not used for the printing operation. On the other hand, even in both a case where the nozzle arrays LNa and LNb of the head chips 51_A to 51_B are the used nozzle arrays and a case where the nozzle arrays LNa and LNb of the head chips 51_A to 51_B are unused nozzle arrays, the nozzle arrays LNa and LNb of the head chips 51_C to 51_L are used nozzle arrays used for ejecting ink.

Although details will be described later with reference to FIG. 8, in the present embodiment, the nozzle arrays LNa and LNb of the head chips 51_A and 51_B are examples of a "first nozzle array", the nozzle array LNa and the nozzle array LNb of the head chips 51_C and 51_D are examples of a "second nozzle array", and the nozzle arrays LNa and LNb of the head chips 51_E to 51_L are examples of a "third nozzle array".

In the example illustrated in FIG. 3, the head chips 51_A to 51_L are disposed in a staggered pattern. Here, the head chips 51_A to 51_L are arranged in the X1 direction in the order of the head chips 51_A, 51_B, 51_C, 51_D, 51_E, 51_F, 51_G, 51_H, 51_I, 51_J, 51_K, and 51_L. However, the positions of the head chips 51_A, 51_C, 51_E, 51_G, 51_I, and 51_K in the direction along the Y-axis are equal to each other. On the other hand, the positions of the head chips 51_B, 51_D, 51_F, 51_H, 51_J, and 51_L in the direction along the Y-axis are positions shifted in the Y2 direction with respect to the head chips 51_A, 51_C, 51_E, 51_G, 51_I, and 51_K, and are equal to each other.

Each of the introduction sections 53_1 to 53_12 is an opening for introducing ink from the outside of the liquid ejecting head 50, and is coupled to the liquid supply mechanism 10. The introduction section 53_1 is coupled to the nozzle arrays LNa of the head chip 51_A and the head chip 51_B via the pressure regulating valve 54_1. The introduction section 53_2 is coupled to the nozzle arrays LNb of the head chip 51_A and the head chip 51_B via the pressure regulating valve 54_2. The introduction section 53_3 is coupled to the nozzle arrays LNa of the head chip 51_C and the head chip 51_D via the pressure regulating valve 54_3. The introduction section 53_4 is coupled to the nozzle arrays LNb of the head chip 51_C and the head chip 51_D via the pressure regulating valve 54_4. The introduction section 53_5 is coupled to the nozzle arrays LNa of the head chip 51_E and the head chip 51_F via the pressure regulating valve 54_5. The introduction section 53_6 is coupled to the nozzle arrays LNb of the head chip 51_E and the head chip 51_F via the pressure regulating valve 54_6. The introduction section 53_7 is coupled to the nozzle arrays LNa of the head chip 51_G and the head chip 51_H via the pressure regulating valve 54_7. The introduction section 53_8 is coupled to the nozzle arrays LNb of the head chip 51_G and the head chip 51_H via the pressure regulating valve 54_8. The introduction section 53_9 is coupled to the nozzle arrays LNa of the head chip 51_I and the head chip 51_J via the pressure regulating valve 54_9. The introduction section 53_10 is coupled to the nozzle arrays LNb of the head chip 51_I and the head chip 51_J via the pressure regulating valve 54_10. The introduction section 53_11 is coupled to the nozzle arrays LNa of the head chip 51_K and the head chip 51_L via the pressure regulating valve 54_11. The introduction section 53_12 is coupled to the nozzle arrays LNb of the head chip 51_K and the head chip 51_L via the pressure regulating valve 54_12.

Each of the pressure regulating valves 54_1 to 54_12 is a valve mechanism that is opened when the pressure of the corresponding nozzle array LN or the flow path communicating with the nozzle array LN is less than a predetermined pressure. Therefore, by opening and closing the pressure regulating valve 54, the pressure of the ink in the flow path communicating with the nozzle array LN to which the ink is supplied is maintained at a negative pressure within a predetermined range. Therefore, the meniscus of the ink formed in the nozzle N of the nozzle array LN to which the ink is supplied is stabilized. As a result, in the nozzle array LN supplied with the ink, it is possible to prevent air bubbles from entering the nozzle N and the ink from overflowing from the nozzle N.

The pressure regulating valve 54 according to the present embodiment is configured not only to be opened and closed according to the pressure of the ink in the flow path communicating with the nozzle array LN supplied with the ink, but also to be forcibly brought into the open state by an external force from an opening mechanism 14 which will be described later. Therefore, it is possible to execute first pressurization cleaning and second pressurization cleaning, which will be described later, and to open the flow path communicating with the nozzle array LN, which is not supplied with the ink, to the atmosphere. A specific configuration example of the pressure regulating valve 54 will be described later with reference to FIG. 5.

The liquid supply mechanism 10 includes liquid storage sections 11_1 to 11_12, a mounting section 12, pressurization mechanisms 13_1 to 13_12, and the opening mechanism 14. Hereinafter, each of the liquid storage sections 11_1 to 11_12 may be referred to as the liquid storage section 11. Each of the pressurization mechanisms 13_1 to 13_12 may be referred to as a pressurization mechanism 13.

Each of the liquid storage sections 11_1 to 11_12 is a container that stores the ink. Examples of specific aspects of the liquid storage section 11 include a cartridge that can be attached to and detached from the mounting section 12, a bag-shaped ink pack made of a flexible film, and an ink tank that can be refilled with ink. The number of the liquid storage sections 11 is not limited to the example illustrated in FIG. 3, and is selected in any desired way. In addition, a correspondence relationship between the liquid storage section 11 and the nozzle array LN is not limited to the example illustrated in FIG. 3, and is any correspondence relationship.

Ink stored in the liquid storage sections 11_1 to 11_12 is not particularly limited, and for example, ink may be water-based ink in which a coloring material such as a dye or a pigment is dissolved in a water-based solvent, may be a solvent-based ink in which a coloring material is dissolved in an organic solvent, may be an ultraviolet curable ink, may be clear ink, white ink, or a process liquid, or may be bio-based ink made by dissolving biomaterials or biocompatible materials in a solvent or dispersing biomaterials or biocompatible materials in a dispersion medium. The types of ink stored in the liquid storage sections 11_1 to 11_12 may be the same as or different from each other.

In the present embodiment, the liquid storage sections 11_3 to 11_12 indicated by solid lines in FIG. 3 are mounted on the mounting section 12. On the other hand, there is a case where the liquid storage sections 11_1 and 11_2 indicated by a two-dot chain line in FIG. 3 are not mounted on the mounting section 12, or the liquid storage sections 11_1 and 11_2 mounted on the mounting section 12 are dummy. In this case, the first mode MD1 (to be described later) is executed. On the other hand, when the regular liquid storage sections 11_1 and 11_2 are mounted on the mounting section 12, the second mode MD2 described later is executed. The dummy liquid storage sections 11_1 and 11_2 are containers that can be mounted on the mounting section 12 but do not store the ink to be supplied to the liquid ejecting head 50. In addition, the regular liquid storage sections 11_1 and 11_2 are containers that can be mounted on the mounting section 12 and that store the ink supplied to the liquid ejecting head 50.

The mounting section 12 is a structure including a holder on which the liquid storage sections 11_1 to 11_12 are individually mounted to be attachable and detachable, and is configured to be able to detect the mounting state of the liquid storage section 11. For example, the mounting section 12 has an element for detecting the mounting state of the liquid storage section 11 in addition to the holder on which the liquid storage section 11 is mounted to be attachable and detachable. Here, the mounting state is not only the presence or absence of mounting of the liquid storage section 11 on the mounting section 12 but also the type of the liquid storage section 11 mounted on the mounting section 12, for example, the type of ink stored in the liquid storage section 11 mounted on the mounting section 12, and the state where the liquid storage section 11 is dummy or regular, and the like.

For example, when the liquid storage section 11 includes a non-volatile memory that stores at least the information on the liquid storage section 11, and a circuit substrate that is electrically coupled to the non-volatile memory and that includes at least a metal terminal that is an electrical contact point with the outside of the liquid storage section 11, specifically with the mounting section 12, the element for detecting the mounting state of the liquid storage section 11 is the metal terminal that comes into contact with the terminal of the liquid storage section 11. Here, the information on the liquid storage section 11 includes information on the type of ink stored inside the liquid storage section 11 or information on whether the liquid storage section 11 is dummy or regular. The terminal of the liquid storage section 11 and the terminal of the mounting section 12 are in contact with each other and electrically conducted, and accordingly, the detection signal DM including the information on the liquid storage section 11 stored in the non-volatile memory of the liquid storage section 11 is sent from the circuit substrate of the liquid storage section 11 to the control unit 20. In addition, when the regular or dummy liquid storage section 11 is not mounted on the mounting section 12, the detection signal DM is not sent to the control unit 20.

As described above, the control unit 20 determines whether or not there is an unused nozzle array that is not coupled to the regular liquid storage section 11 based on the presence or absence of reception of the detection signal DM and the information included in the received detection signal DM.

In addition to the holder on which the liquid storage section 11 is mounted, the mounting section 12 may include, for example, a sensor such as an optical type or a contact type as an element for detecting the presence or absence of the mounting of the liquid storage section 11. When the sensor detects the liquid storage section 11 mounted on the mounting section 12, the detection signal DM including information that the liquid storage section 11 is mounted on the mounting section 12 is sent from the mounting section 12 to the control unit 20. Then, when the liquid storage section 11 is not mounted on the mounting section 12, the mounting state of the liquid storage section 11 with respect to the plurality of mounting sections 12 may be detected by not transmitting the detection signal DM to the mounting section 12. As described above, the control unit 20 may determine whether or not there is an unused nozzle array that is not coupled to the regular liquid storage section 11 based on the presence or absence of reception of the detection signal DM.

The ink stored in the liquid storage section 11 mounted on the mounting section 12 is introduced into the introduction section 53 by the pressure of the pressurization mechanism 13. Here, the pressurization mechanism 13_1 introduces the ink stored in the liquid storage section 11_1 into the introduction section 53_1 under the control of the control unit 20. Under the control of the control unit 20, the pressurization mechanisms 13_2 to 13_12 introduce the ink stored in the liquid storage sections 11_2 to 11_12 into the introduction sections 53_2 to 53_12.

As described above, under the control of the control unit 20, the pressurization mechanism 13 pressurizes the ink in the liquid storage section 11 mounted on the mounting section 12 toward the liquid ejecting head 50. The pressurization mechanism 13 is, for example, a pump such as a syringe pump, a diaphragm pump, a tube pump, or a compressor that is coupled to the liquid storage section 11 and pressurizes the inside of the liquid storage section 11. The pressurization mechanism 13 according to the present embodiment can execute pressurization cleaning in which the ink is discharged from the nozzle of the liquid ejecting head 50 by pressurization under the control of the control unit 20. The pressurization mechanism 13 may be able to pressurize the ink from the liquid storage section 11 toward the liquid ejecting head 50, and may be provided in the middle of a flow path for transferring the ink from the liquid storage section 11 to the liquid ejecting head 50.

The opening mechanism 14 is a mechanism forcibly bringing the pressure regulating valve 54 into the open state by applying an external force to the pressure regulating valve 54. The opening mechanism 14 has, for example, a pump, a common flow path, a buffer chamber, a plurality of branch flow paths, and a plurality of electromagnetic valves. The pump is a pressurizing pump that pressurizes air. The common flow path is a flow path coupled to the pump. The buffer chamber is provided in the middle of the common flow path, and temporarily stores air pressurized by the pump. The plurality of branch flow paths correspond to the pressure regulating valves 54_1 to 54_12, are flow paths branched from the common flow path at positions downstream of the buffer chamber, and are coupled to the corresponding pressure regulating valve 54. The plurality of electromagnetic valves correspond to the plurality of branch flow paths and are opening/closing valves provided in the middle of the corresponding branch flow paths. The opening mechanism 14 forcibly brings the target pressure regulating valve 54 into the open state by pressurizing a pressure regulation chamber RV (to be described later) of the target pressure regulating valve 54 under the control of the control unit 20.

The configuration of the opening mechanism 14 is determined according to the configuration of the pressure regulating valve 54, is not limited to the configuration using pressurized air as described above, and is selected in any desired way. Further, the opening mechanism 14 may be an external element of the liquid supply mechanism 10.

1-4. Configuration of Head Chip

Figure 4:
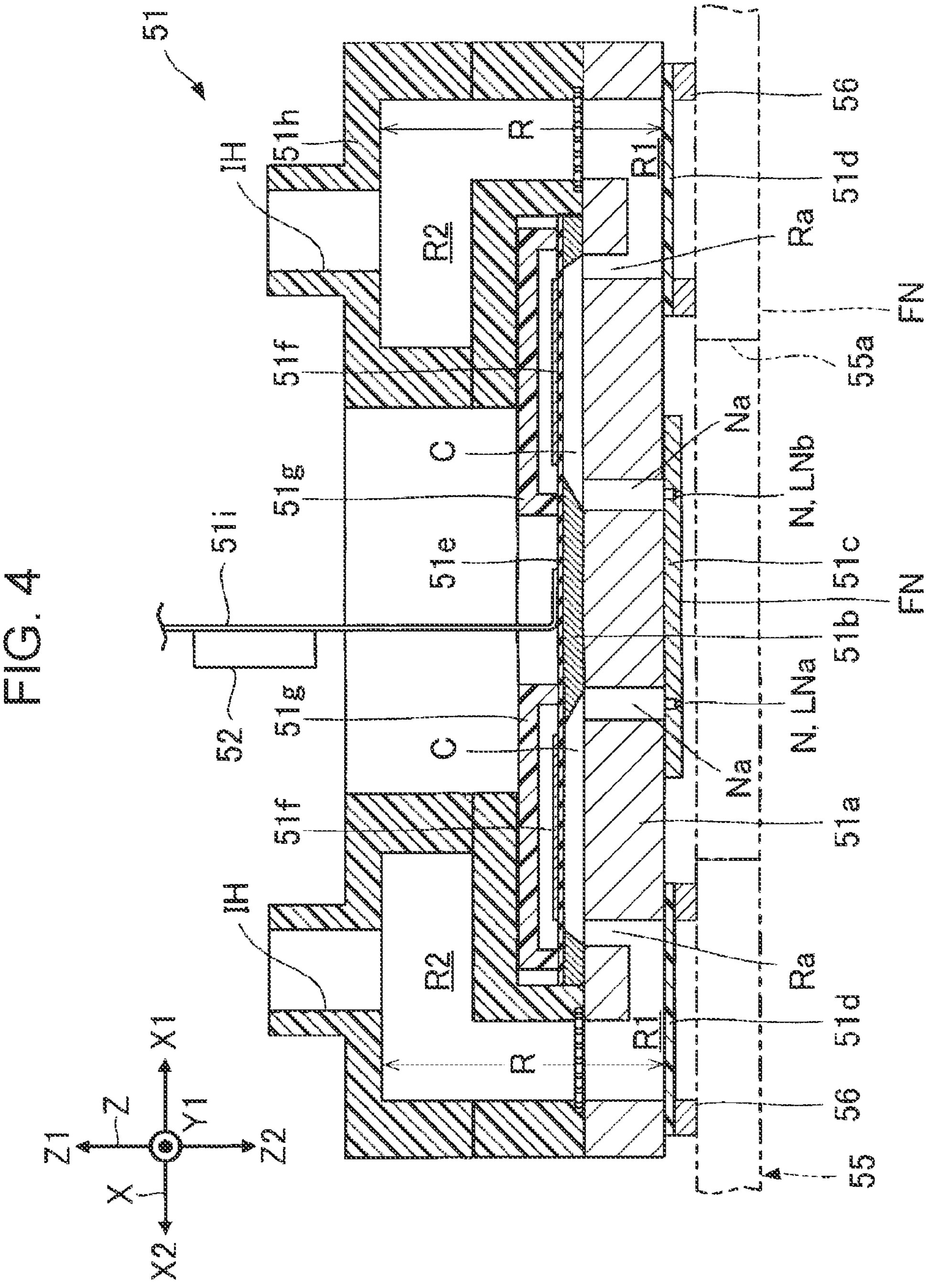
FIG. 4 is a cross-sectional view of a head chip of a liquid ejecting head.

FIG. 4 is a cross-sectional view of the head chip 51 of the liquid ejecting head 50. In addition, the head chip 51 has a configuration substantially symmetrical with each other in the direction along the X-axis. However, positions of the plurality of nozzles N of the nozzle array LNa and the plurality of nozzles N of the nozzle array LNb in the direction along the Y-axis may coincide with or may be different from each other. FIG. 4 illustrates a configuration in which the positions of the plurality of nozzles N of the nozzle array LNa and the plurality of nozzles N of the nozzle array LNb coincide with each other in the direction along the Y-axis.

As illustrated in FIG. 4, the head chip 51 includes a flow path substrates 51*a*, a pressure chamber substrate 51*b*, a nozzle plate 51*c*, a vibration absorbing body 51*d*, a vibration plate 51*e*, a plurality of drive elements 51*f*, a protective plate 51*g*, a case 51*h*, and a wiring substrate 51*i*.

The flow path substrate 51*a* and the pressure chamber substrate 51*b* are stacked in this order in the Z1 direction, and form a flow path for supplying the ink to the plurality of nozzles N. The vibration plate 51*e*, the plurality of drive elements 51*f*, the protective plate 51*g*, the case 51*h*, and the wiring substrate 51*i* are installed in a region positioned in the Z1 direction with respect to a stacked body formed by the flow path substrate 51*a* and the pressure chamber substrate 51*b*. On the other hand, the nozzle plate 51*c* and the vibration absorbing body 51*d* are installed in a region positioned in the Z2 direction with respect to the stacked body. Each element of the head chip 51 is schematically a plate-shaped member elongated in the Y-direction, and the elements are joined to each other by using an adhesive, for example. Hereinafter, each element of the head chip 51 will be described in order.

The nozzle plate 51*c* is a plate-shaped member provided with the plurality of nozzles N of each of the nozzle array LNa and the nozzle array LNb. Each of the plurality of nozzles N is a through-hole through which ink is passed. The nozzle plate 51*c* is manufactured in such a manner that a silicon single crystal substrate is processed by a semiconductor manufacturing technique using a processing technique such as dry etching or wet etching, for example. However, other known methods and materials may be appropriately used for manufacturing the nozzle plate 51*c*. In addition, a cross-sectional shape of the nozzle is typically a circular shape, but the shape is not limited thereto, and may be a non-circular shape such as a polygon or an ellipse, for example. A surface of the nozzle plate 51*c* facing the Z2 direction forms a part of the ejection surface FN.

A space R1, a plurality of individual flow paths Ra, and a plurality of communication flow paths Na are provided in the flow path substrate 51*a* for each of the nozzle array LNa and the nozzle array LNb. The space R1 is an elongated opening extending in the direction along the Y-axis in plan view in the direction along the Z-axis. Each of the individual flow path Ra and the communication flow path Na is a through-hole formed for every nozzle N. Each individual flow path Ra communicates with the space R1.

The pressure chamber substrate 51*b* is a plate-shaped member in which a plurality of pressure chambers C called cavities are provided for each of the nozzle array LNa and the nozzle array LNb. The plurality of pressure chambers C are arranged in the direction along the Y-axis. Each of the pressure chambers C is an elongated space formed for every nozzle N and extending in the direction along the X-axis in plan view. As in the above-described nozzle plate 51*c*, each of the flow path substrate 51*a* and the pressure chamber substrate 51*b* is manufactured in such a manner that a silicon single crystal substrate is processed by a semiconductor manufacturing technique, for example. However, other known methods and materials may be appropriately used for manufacturing each of the flow path substrate 51*a* and the pressure chamber substrate 51*b*.

The pressure chamber C is a space positioned between the flow path substrate 51*a* and the vibration plate 51*e*. The plurality of pressure chambers C are arranged in the direction along the Y-axis for each of the nozzle array LNa and the nozzle array LNb. In addition, the pressure chamber C communicates with each of the communication flow path Na and the individual flow path Ra. Therefore, the pressure chamber C communicates with the nozzle N via the communication flow path Na, and communicates with the space R1 via the individual flow path Ra.

The vibration plate 51*e* is disposed on a surface of the pressure chamber substrate 51*b* facing the Z1 direction. The vibration plate 51*e* is a plate-shaped member which can elastically vibrate. For example, the vibration plate 51*e* includes an elastic film made of silicon oxide ($SiO_2$) and an insulating film made of zirconium oxide ($ZrO_2$), and these films are stacked in this order in the Z1 direction. The elastic film is formed, for example, by thermally oxidizing one surface of a silicon single crystal substrate. The insulating film is formed by, for example, forming a zirconium layer by a sputtering method and thermally oxidizing the layer. The vibration plate 51*e* is not limited to the above-described configuration in which the elastic film and the insulating film are stacked. For example, the configuration may include a single layer, or may include three or more layers.

The plurality of drive elements 51*f* mutually corresponding to the nozzles N are disposed on a surface of the vibration plate 51*e* facing the Z1 direction for each of the nozzle array LNa and the nozzle array LNb. Each of the drive elements 51*f* is a passive element deformed by the supply of the drive signal. Each of the drive elements 51*f* has an elongated shape extending in the direction along the X-axis in plan view. The plurality of drive elements 51*f* are arranged in the direction along the Y-axis to correspond to the plurality of pressure chambers C. The drive element 51*f* overlaps the pressure chamber C in plan view.

Each of the drive elements 51*f* is a piezoelectric element, and although not illustrated, the drive element 51*f* includes a first electrode, a piezoelectric layer, and a second electrode, which are stacked in this order in the Z1 direction. One electrode of the first electrode and the second electrode is an individual electrode disposed apart from each other for each drive element 51*f*, and the drive signal Com is supplied to the one electrode. The other electrode of the first electrode and the second electrode is a band-shaped common electrode extending in the direction along the Y-axis to be continuous over the plurality of drive elements 51*f*, and for example, a constant potential is supplied to the other electrode. The piezoelectric layer is made of a piezoelectric material such as lead zirconate titanate ($Pb(Zr, Ti)O_3$), and for example, has a band shape extending in the direction along the Y-axis to be continuous over the plurality of drive elements 51*f*. However, the piezoelectric layer may be integrated over the plurality of drive elements 51*f*. In this case, the piezoelectric layer is provided with a through-hole penetrating the piezoelectric layer to extend in the direction along the X-axis in a region corresponding to a gap between the pressure chambers C adjacent to each other in plan view. When the vibration plate 51*e* vibrates in conjunction with deformation of the above-described drive elements 51*f*, the pressure inside the pressure chambers C fluctuates to eject the ink from the nozzle N.

The protective plate 51*g* is a plate-shaped member installed on a surface of the vibration plate 51*e* facing the Z1 direction, protects the plurality of drive elements 51*f*, and reinforces mechanical intensity of the vibration plate 51*e*. Here, the plurality of drive elements 51*f* are accommodated between the protective plate 51*g* and the vibration plate 51*e*. For example, the protective plate 51*g* is made of a resin material.

The case 51*h* is a member for storing the ink to be supplied to the plurality of pressure chambers C. For example, the case 51*h* is made of a resin material. The case 51*h* is provided with a space R2 for each of the nozzle array LNa and the nozzle array LNb. The space R2 is a space communicating with the above-described space R1, and functions as a reservoir R that stores the ink to be supplied to the plurality of pressure chambers C together with the space R1. The case 51*h* is provided with an introduction port IH for supplying the ink to each reservoir R. The ink inside each reservoir R is supplied to the pressure chamber C via each individual flow path Ra.

The vibration absorbing body 51*d* is also referred to as a compliance substrate, is a flexible resin film that forms a wall surface of the reservoir R, and absorbs pressure fluctuations of the ink inside the reservoir R. The vibration absorbing body 51*d* may be a flexible thin plate made of metal. A surface of the vibration absorbing body 51*d* facing the Z1 direction is joined to the flow path substrate 51*a* by using an adhesive or the like. On the other hand, a fixing plate 55 is joined to the surface of the vibration absorbing body 51*d* facing the Z2 direction via a frame body 56 by using an adhesive or the like. The frame body 56 is a frame-shaped member along the outer periphery of the vibration absorbing body 51*d*, and is made of, for example, a metal material.

The fixing plate 55 is a plate-shaped member for fixing the plurality of head chips 51 to a holder (not illustrated). The fixing plate 55 is provided with a plurality of opening portions 55*a* exposing the nozzle plate 51*c* of each head chip 51. In an example illustrated in FIG. 4, the plurality of opening portions 55*a* are individually provided for each head chip 51. For example, the fixing plate 55 is made of a metal material such as stainless steel, titanium, and magnesium alloy.

The surface of the fixing plate 55 facing the Z2 direction described above forms a part of the ejection surface FN together with a part exposed from the opening portion 55*a* on the surface of each head chip 51 facing the Z2 direction.

The wiring substrate 51*i* is mounted on a surface of the vibration plate 51*e* facing the Z1 direction, and is a mounting component for electrically coupling the head chip 51, the drive circuit 52, and the control unit 20. For example, the wiring substrate 51*i* is a flexible wiring substrate such as a chip on film (COF), a flexible printed circuit (FPC) or a flexible flat cable (FFC). The drive circuit 52 is mounted on the wiring substrate 51*i* according to the present embodiment. The drive circuit 52 is a circuit including a switching element for switching whether or not to supply at least a part of a waveform included in the drive signal Com to the drive element 51*f* as a drive pulse, based on the control signal SI.

In the above-described head chip 51, since the drive element 51*f* is driven by the drive signal Com, the pressure inside the pressure chamber C fluctuates, and the ink is ejected from the nozzle N in accordance with the fluctuation.

1-5. Configuration Example of Pressure Regulating Valve

Figure 5:
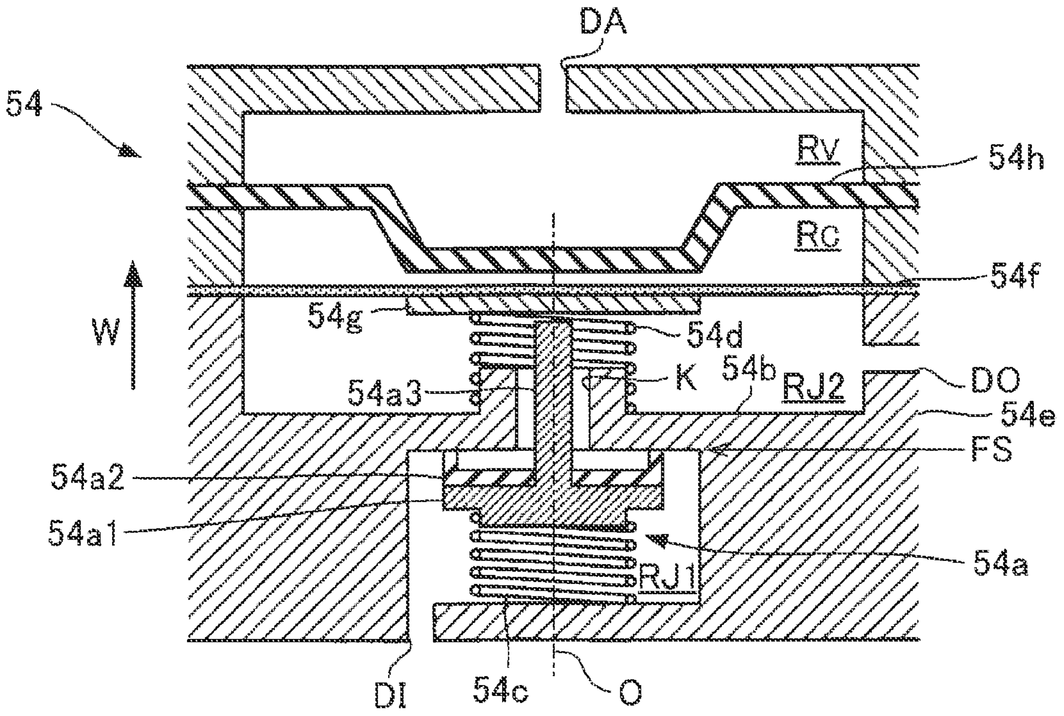
FIG. 5 is a cross-sectional view illustrating an example of a pressure regulating valve.

FIG. 5 is a cross-sectional view illustrating an example of the pressure regulating valve 54. As illustrated in FIG. 5, the pressure regulating valve 54 includes an upstream flow path RJ1 and a downstream flow path RJ2, which form a part of the flow path of the ink from the introduction section 53 to the head chip 51. The upstream flow path RJ1 is provided with an inlet DI of the ink, and the downstream flow path RJ2 is provided with an outlet DO of the ink. The ink from the liquid supply mechanism 10 flows into the inlet DI. The outlet DO discharges the ink to be supplied to the liquid ejecting head 50.

The pressure regulating valve 54 includes a valve body 54*a*, a valve seat 54*b*, a spring 54*c*, and a spring 54*d*. The valve body 54*a* opens and closes the upstream flow path RJ1 by moving in a W direction or a direction opposite thereto in the drawing to be closer to or separated from the valve seat 54*b*.

The valve seat 54*b* is a part of a support body 54*e* which is positioned between the upstream flow path RJ1 and the downstream flow path RJ2, and faces a part of a flexible film 54*f* that seals the downstream flow path RJ2 at an interval. A through-hole K penetrating the support body 54*e* is provided at substantially the center of the valve seat 54*b*. The upstream flow path RJ1 and the downstream flow path RJ2 communicate with each other via the through-hole K.

The valve body 54*a* is installed inside the upstream flow path RJ1. The valve body 54*a* includes a base section 54*a*1, a sealing section 54*a*2, and a valve shaft 54*a*3. The base section 54*a*1 is a circular flat plate part having an outer diameter greater than the inner diameter of the through-hole K. The valve shaft 54*a*3 coaxially and vertically projects on a surface of the base section 54*a*1, and the annular sealing section 54*a*2 is installed to surround the valve shaft 54*a*3 in plan view. The base section 54*a*1 and the sealing section 54*a*2 are positioned inside the upstream flow path RJ1 in a state where an axis O of the valve shaft 54*a*3 is parallel to the W direction and the valve shaft 54*a*3 is inserted into the through-hole K of the valve seat 54*b*. A gap is formed between an inner peripheral surface of the through-hole K of the valve seat 54*b* and an outer peripheral surface of the valve shaft 54*a*3. The spring 54*c* is installed inside the upstream flow path RJ1 between a surface of the support body 54*e* facing the valve seat 54*b* and the base section 54*a*1 of the valve body 54*a*, and biases the valve body 54*a* toward the valve seat 54*b*. On the other hand, the spring 54*d* is installed inside the downstream flow path RJ2 between the valve seat 54*b* and a pressure receiving plate 54*g*. The sealing section 54*a*2 of the valve body 54*a* is positioned between the base section 54*a*1 and the valve seat 54*b*, and functions as a seal for closing the through-hole K by coming into contact with a sealing surface FS of the valve seat 54*b*.

An atmospheric pressure chamber RC communicating with an external space of the atmospheric pressure is adjacent to the downstream flow path RJ2 via the flexible film 54*f*. The flexible film 54*f* is a flexible elastic film, and is made of a film, rubber, or fibers, for example. As illustrated in FIG. 5, when the pressure inside the downstream flow path RJ2 is maintained within a predetermined range, the sealing section 54*a*2 of the valve body 54*a* is pressed against the sealing surface FS of the valve seat 54*b* by a biasing force of the spring 54*d*. In this manner, the upstream flow path RJ1 and the downstream flow path RJ2 are blocked from each other. On the other hand, when the pressure inside the downstream flow path RJ2 is equal to or lower than a predetermined negative pressure, the sealing section 54*a*2 of the valve body 54*a* is separated from the sealing surface FS of the valve seat 54*b* against the biasing force of the spring 54*c* and the spring 54*d*. In this manner, the upstream flow path RJ1 and the downstream flow path RJ2 communicate with each other. That is, the pressure regulating valve 54 is configured to set the pressure of the ink inside the liquid ejecting head 50 to the predetermined negative pressure such that the meniscus of the ink which enables the ink to be ejected from the nozzle N is formed inside the nozzle N.

In the pressure regulating valve 54, the pressure regulation chamber RV is adjacent to the atmospheric pressure chamber RC via an elastic member 54*h*. The elastic member 54*h* is a plate-shaped flexible member, and is made of an elastic material such as rubber. The pressure regulation chamber RV communicates with a gas flow path port DA. The opening mechanism 14 illustrated in FIG. 3 described above is coupled to the gas flow path port DA. Since the opening mechanism 14 pressurizes the pressure regulation chamber RV, the elastic member 54*h* can be bent and deformed to be pressed toward the flexible film 54*f*. As a result, the sealing section 54*a*2 of the valve body 54*a* can be separated from the sealing surface FS of the valve seat 54*b* against the biasing force of the spring 54*c* and the spring 54*d*. In this manner, without depending on the pressure of the downstream flow path RJ2, the upstream flow path RJ1 and the downstream flow path RJ2 can communicate with each other by an operation of the opening mechanism 14.

As described above, the pressure regulating valve 54 can be forcibly brought into the open state by the operation of the opening mechanism 14. Here, by forcibly bringing the pressure regulating valve 54 corresponding to the used nozzle array into the open state, the first pressurization cleaning and the second pressurization cleaning, which will be described later, are executed by the pressurization by the pressurization mechanism 13.

1-6. Maintenance Mechanism

Figure 6:
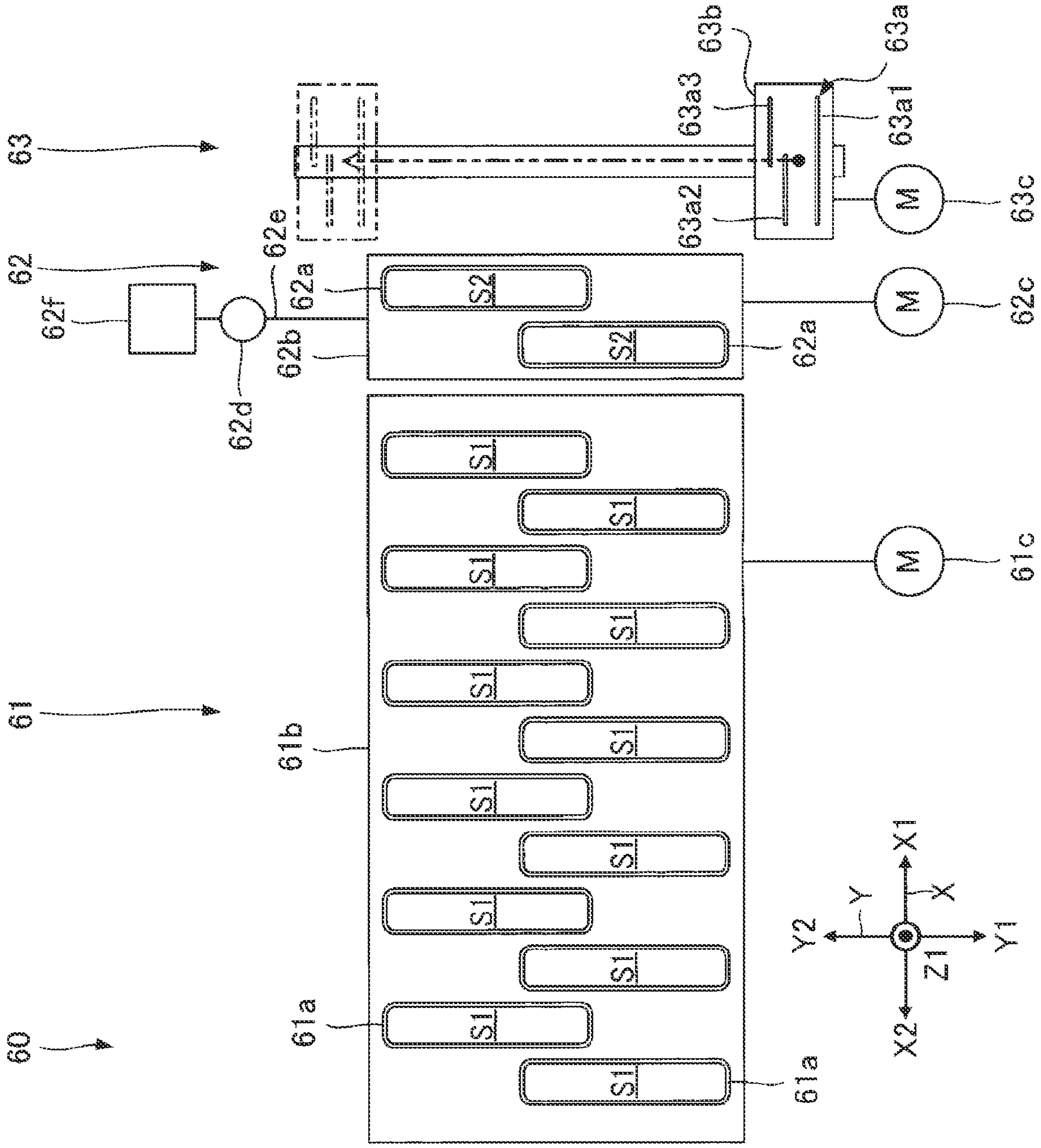
FIG. 6 is a view illustrating a schematic configuration of a maintenance mechanism.
Figure 7:
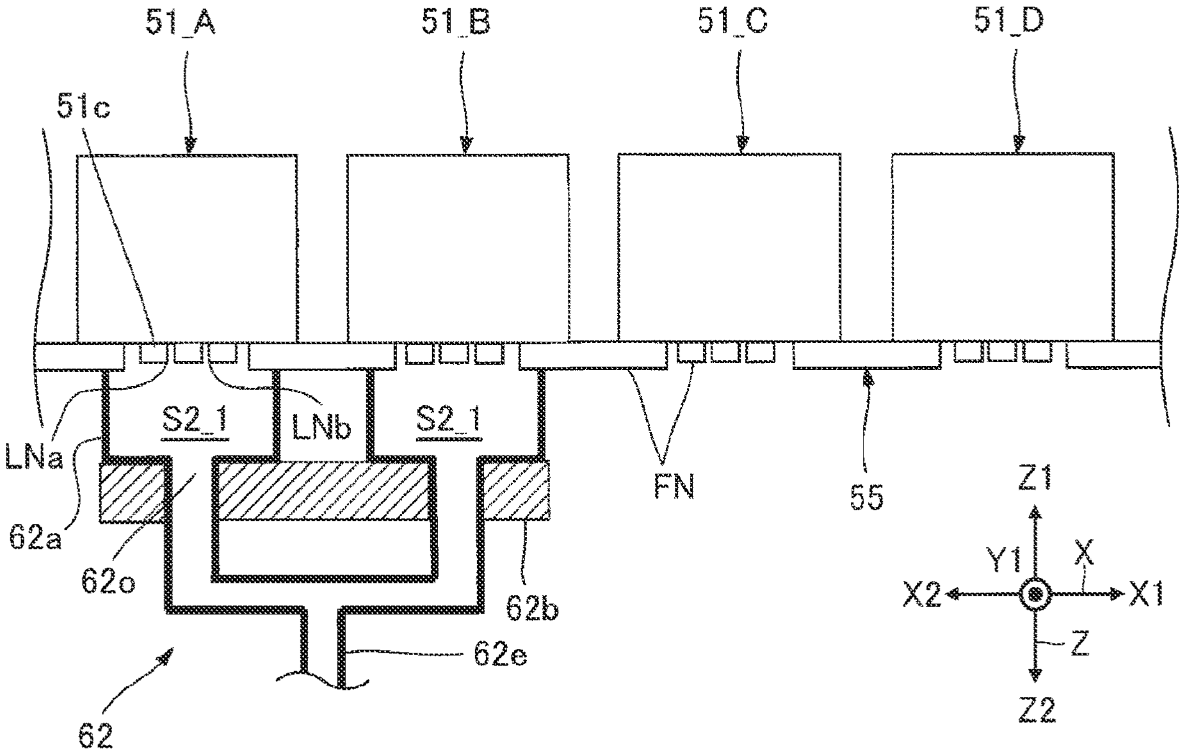
FIG. 7 is a schematic view for describing suction cleaning by the maintenance mechanism.

FIG. 6 is a view illustrating a schematic configuration of the maintenance mechanism 60. FIGS. 7 and 8 are schematic views for describing the suction cleaning by the maintenance mechanism 60. FIG. 7 corresponds to FIG. 14 which will be described later, and illustrates the cleaning operation on an unused nozzle array. Further, FIG. 8 corresponds to FIG. 15 which will be described later, and illustrates the cleaning operation with respect to the used nozzle array.

The maintenance mechanism 60 is a mechanism for performing maintenance of the liquid ejecting head 50. In the example illustrated in FIG. 6, the maintenance mechanism 60 has a cap mechanism 61, a suction cleaning mechanism 62, and a wiping mechanism 63. In the example illustrated in FIG. 6, the cap mechanism 61, the suction cleaning mechanism 62, and the wiping mechanism 63 are arranged in this order in the X1 direction. The arrangement order of the cap mechanism 61, the suction cleaning mechanism 62, and the wiping mechanism 63 is not limited to the example illustrated in FIG. 6, and is any desired order.

The cap mechanism 61 is a mechanism that caps all of the nozzles N of the liquid ejecting head 50. In the example illustrated in FIG. 6, the cap mechanism 61 caps the nozzles N for each head chip 51. Specifically, the cap mechanism 61 has a plurality of caps 61*a*, a support body 61*b*, and a movement mechanism 61*c*. The cap mechanism 61 is not limited to the example illustrated in FIG. 6. For example, the cap mechanism 61 may cap the nozzles N for each of two or more head chips 51 or may cap all the nozzles N at once.

Each cap 61*a* is a lid body having a recess portion that forms the space S1, and includes a recessed-shaped main body portion made of resin or the like and an annular edge portion provided at the tip end portion of the main body portion in the Z1 direction. The edge portion is made of an elastic material such as a rubber material or an elastomer material. The cap 61*a* comes into contact with the surface of the fixing plate 55 that forms the ejection surface FN at the edge portion, thereby forming the space S1 as a closed space with the ejection surface FN including the nozzle plate 51*c*.

Accordingly, it is possible to prevent moisture from evaporating from the ink in the nozzles N and thickening. In other words, the cap 61*a* is a moisturizing cap for moisturizing the nozzle N. In the example illustrated in FIG. 6, the recess portion is open in the Z1 direction, and the cap 61*a* is disposed at a position in the Z2 direction with respect to the ejection surface FN at the home position.

The plurality of caps 61*a* correspond to the plurality of head chips 51 included in the liquid ejecting head 50, and are disposed in a staggered manner when viewed in the Z2 direction, similar to the head chips 51_A to 51_L described above. Specifically, the cap 61*a* disposed at the end in the X2 direction corresponds to the head chip 51_A, and the cap 61*a* disposed at the end in the X1 direction corresponds to the head chip 51_L.

The support body 61*b* is a structure that supports the plurality of caps 61*a*, and is made of metal or the like, for example. In the example illustrated in FIG. 6, the support body 61*b* has a surface facing the Z1 direction, and each of the plurality of caps 61*a* is supported on the surface. Here, each of the plurality of caps 61*a* is fixed to the support body 61*b* by screwing, adhesive, or the like.

The movement mechanism 61*c* is a mechanism for reciprocating the support body 61*b* in the direction along the Z-axis, and includes, for example, an elevation mechanism and a motor that drives the elevation mechanism. The movement mechanism 61*c* moves the support body 61*b* between a contact position where the cap 61*a* is in contact with the ejection surface FN at the home position and a retracted position which is a position in the Z2 direction from the contact position.

The suction cleaning mechanism 62 is a mechanism that performs suction cleaning of the nozzles N by discharging the ink from the nozzles N of the liquid ejecting head 50 by suction. In the example illustrated in FIG. 6, the suction cleaning mechanism 62 performs suction cleaning of the nozzles N of two head chips 51 adjacent to each other in the direction along the X-axis among the plurality of head chips 51 included in the liquid ejecting head 50. Specifically, the suction cleaning mechanism 62 has two caps 62*a*, a support body 62*b*, a movement mechanism 62*c*, a decompression mechanism 62*d*, a waste liquid tube 62*e*, and a waste liquid tank 62*f*.

Each cap 62*a* is a lid body having a recess portion that forms the space S2, and includes a recessed-shaped main body portion made of resin or the like and an annular edge portion provided at the tip end portion of the main body portion in the Z1 direction. Similar to the cap 61*a* described above, the edge portion is made of an elastic material such as a rubber material or an elastomer material. The cap 62*a* comes into contact with the surface of the fixing plate 55 that forms the ejection surface FN at the edge portion, thereby forming the space S2 as a closed space between the cap 62*a* and the ejection surface FN. In the example illustrated in FIG. 6, the recess portion is open in the Z1 direction, and the cap 62*a* is disposed at a position in the Z2 direction with respect to the ejection surface FN positioned in the X1 direction from the home position.

The two caps 62*a* correspond to the two head chips 51 adjacent to each other in the direction along the X-axis, and are disposed to be shifted from each other in the direction along both the X-axis and the Y-axis similar to the two head chips 51 when viewed in the Z2 direction.

The support body 62*b* is a structure that supports the two caps 62*a*, and is made of metal or the like, for example. In the example illustrated in FIG. 6, the support body 62*b* has a surface facing the Z1 direction, and each of the two caps 62*a* is supported on the surface. Here, each of the two caps 62*a* is fixed to the support body 62*b* by screwing, adhesive, or the like.

The movement mechanism 62*c* is a mechanism for reciprocating the support body 61*b* in the direction along the Z-axis, and includes, for example, an elevation mechanism and a motor that drives the elevation mechanism. The movement mechanism 61*c* moves the support body 61*b* between a contact position where the cap 62*a* is in contact with the ejection surface FN positioned in the X1 direction from the home position and a retracted position which is a position in the Z2 direction from the contact position.

Figure 8:
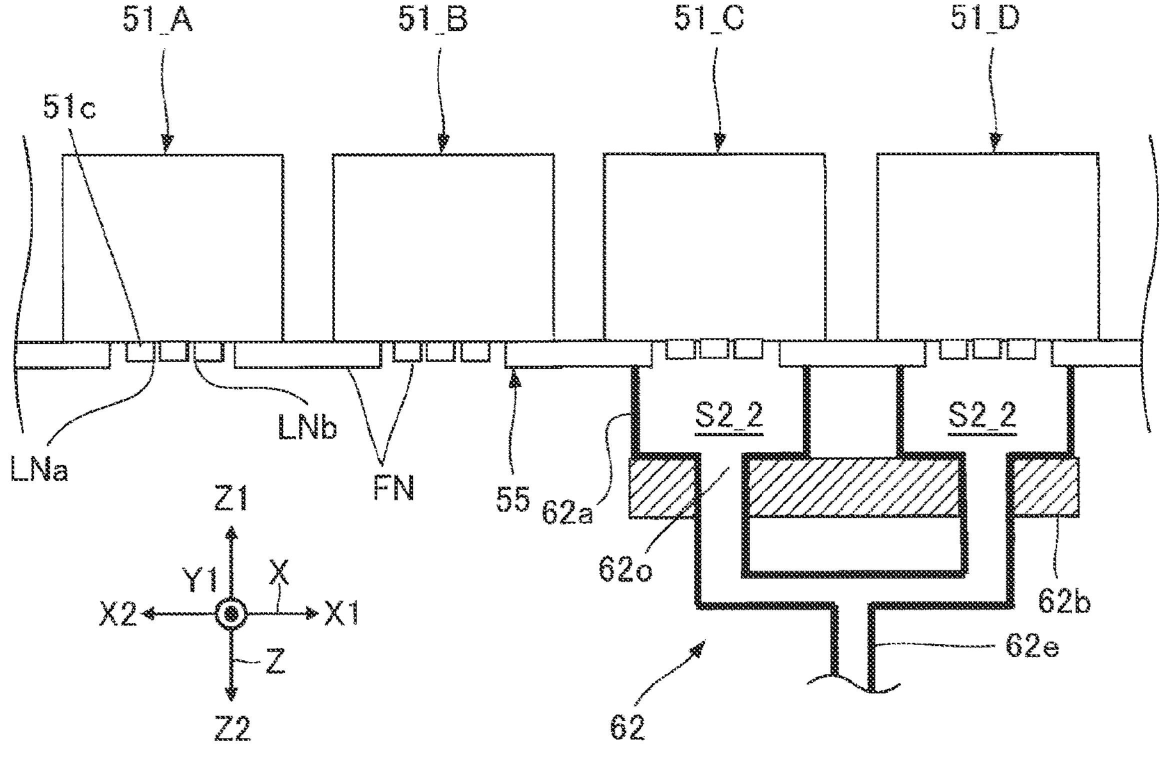
FIG. 8 is a schematic view for describing suction cleaning by the maintenance mechanism.

As illustrated in FIGS. 7 and 8, a suction port 62*o* is open on a bottom wall of the recess portion of the cap 62*a*. One end of the waste liquid tube 62*e* for allowing the space S2 in the cap 62*a* to communicate with the waste liquid tank 62*f* is coupled to the suction port 62*o*. The decompression mechanism 62*d* is provided in the middle of the waste liquid tube 62*e*. The waste liquid tube 62*e* according to the present embodiment is coupled to each suction port 62*o* of the two caps 62*a* by branching between the cap 62*a* and the decompression mechanism 62*d*. The decompression mechanism 62*d* is a mechanism for decompressing the space S2 in the cap 62*a*, and is, for example, a tube pump. The decompression mechanism 62*d* may be provided in the waste liquid tank 62*f*, and may be a vacuum pump or the like that decompresses the inside of the waste liquid tank 62*f*.

As illustrated in FIGS. 7 and 8, the ink is sucked and discharged from the nozzles N surrounded by the cap 62*a* by performing decompression in a state where the space S2 is a closed space by the ejection surface FN. As a result, the ink in the nozzle N is refreshed. The ink discharged from the nozzle N is collected in the waste liquid tank 62*f* via the suction port 62*o* and the waste liquid tube 62*e*. FIG. 7 illustrates a state where the space S2 is formed as the first closed space S2_1 such that the plurality of nozzles N that constitute the nozzle arrays LNa and LNb of the head chip 51_A and the head chip 51_B are open to the space S2. FIG. 8 illustrates a state where the space S2 is formed as the second closed space S2_2 such that the plurality of nozzles N that constitute the nozzle arrays LNa and LNb of the head chip 51_C and the head chip 51_D are open to the space S2.

The wiping mechanism 63 is a mechanism of wiping the ejection surface FN (to be described later) of the liquid ejecting head 50. In the example illustrated in FIG. 6, the wiping mechanism 63 wipes a region of the ejection surface FN including two head chips 51 adjacent to each other in the direction along the X-axis among the plurality of head chips 51 included in the liquid ejecting head 50. Specifically, the wiping mechanism 63 has a wiping member 63*a*, a support body 63*b*, and a movement mechanism 63*c*.

The wiping member 63*a* is a member for wiping the ejection surface FN of the liquid ejecting head 50. In the example illustrated in FIG. 6, the wiping member 63*a* is configured with wiping members 63*a*1, 63*a*2, and 63*a*3. Each of the wiping members 63*a*1, 63*a*2, and 63*a*3 is a blade-shaped elastic member made of an elastic material such as rubber, having an elongated shape extending in the direction along the X-axis, and protruding in the Z1 direction.

The wiping members 63*a*1, 63*a*2, and 63*a*3 are arranged in this order at intervals in the Y2 direction. However, the length of each of the wiping members 63*a*2 and 63*a*3 in the direction along the X-axis is shorter than the length of the wiping member 63*a*1 in the direction along the X-axis. The wiping member 63*a*2 is disposed at a position in the X2 direction from the center of the wiping member 63*a*1 in the direction along the X-axis. On the other hand, the wiping member **63*a*3 is disposed at a position in the X1 direction from the center of the wiping member 63*a*1** in the direction along the X-axis.

Here, the length of the wiping member **63*a*1 in the direction along the X-axis is approximately equal to the width of the group of two head chips 51 adjacent to each other in the direction along the X-axis, in the direction along the X-axis, or slightly longer than this. On the other hand, the length of the wiping member 63*a*2 in the direction along the X-axis is approximately equal to the width of the group of one head chip 51 in the direction along the X-axis, or slightly longer than this. Similarly, the length of the wiping member 63*a*3 in the direction along the X-axis is approximately equal to the width of the group of one head chip 51** in the direction along the X-axis, or slightly longer than this.

The wiping member **63*a* is not limited to the example illustrated in FIG. 6. For example, the wiping member 63*a*** may be formed of two or less or four or more blade-shaped elastic members, and may be formed of a fiber material such as a woven fabric or a non-woven fabric, or a porous member such as a sponge.

The support body **63*b* is a structure that supports the wiping member 63*a*, and is made of metal or the like, for example. In the example illustrated in FIG. 6, the support body 63*b* has a surface facing the Z1 direction, and the wiping member 63*a* is supported on the surface. Here, the wiping member 63*a* is fixed to the support body 63*b*** by screwing, an adhesive, or the like.

The movement mechanism **63*c* is a mechanism for reciprocating the support body 63*b* in the direction along the Y-axis, and includes, for example, a linear motion mechanism and a motor that drives the linear motion mechanism. The movement mechanism 63*c* moves the support body 63*b* such that the wiping member 63*a*** reciprocates between a position deviated in the Y1 direction and a position deviated in the Y2 direction with respect to the ejection surface FN positioned in the X1 direction from the home position.

1-7. First Mode and Second Mode

Figure 9:
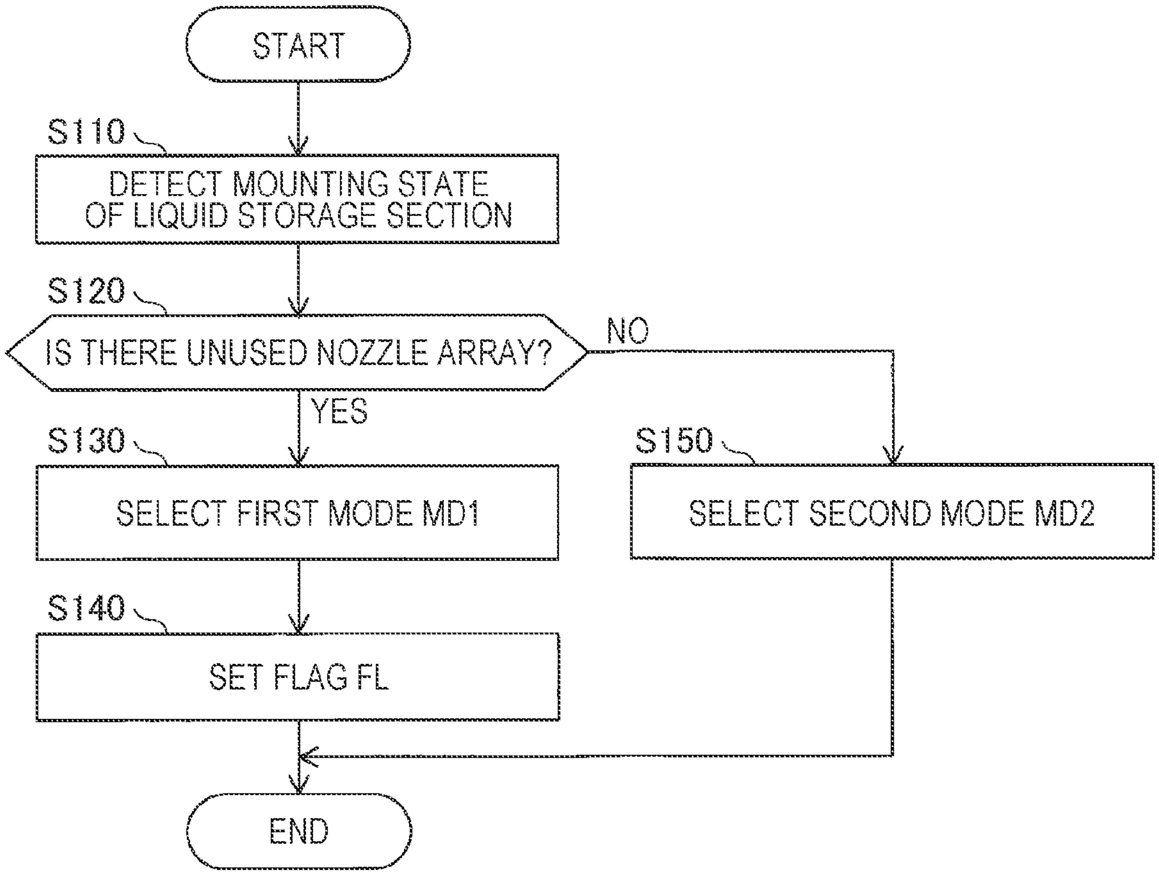
FIG. 9 is a flowchart for describing selection of a first mode and a second mode.

FIG. 9 is a flowchart for describing the selection of the first mode MD1 and the second mode MD2. The liquid ejecting apparatus 100 selects one of the first mode MD1 and the second mode MD2 based on the mounting state of the liquid storage section 11 with respect to the mounting section 12 described above.

Specifically, as illustrated in FIG. 9, first, in step S110, the control section **21*a* detects the mounting state of the liquid storage section 11 with respect to the mounting section 12**. This detection is performed by acquiring the detection signal Dm.

Next, in step S120, the control section **21*a* determines whether or not there is an unused nozzle array that is the nozzle array LN to which the regular liquid storage section 11** is not coupled. As described above, this determination is made based on the detection signal Dm.

When there is an unused nozzle array (step S120: YES), the control section **21*a* selects the first mode MD1 in step S130, and then sets a flag FL for executing the sequence SQ1, which will be described later, in step S140**.

On the other hand, when there is no unused nozzle array (step S120: NO), the control section **21*a* selects the second mode MD2 in step S150. In this case, the control section 21*a* does not set the flag FL. That is, the sequence SQ1 is not executed in the second mode MD2**.

Figure 10:
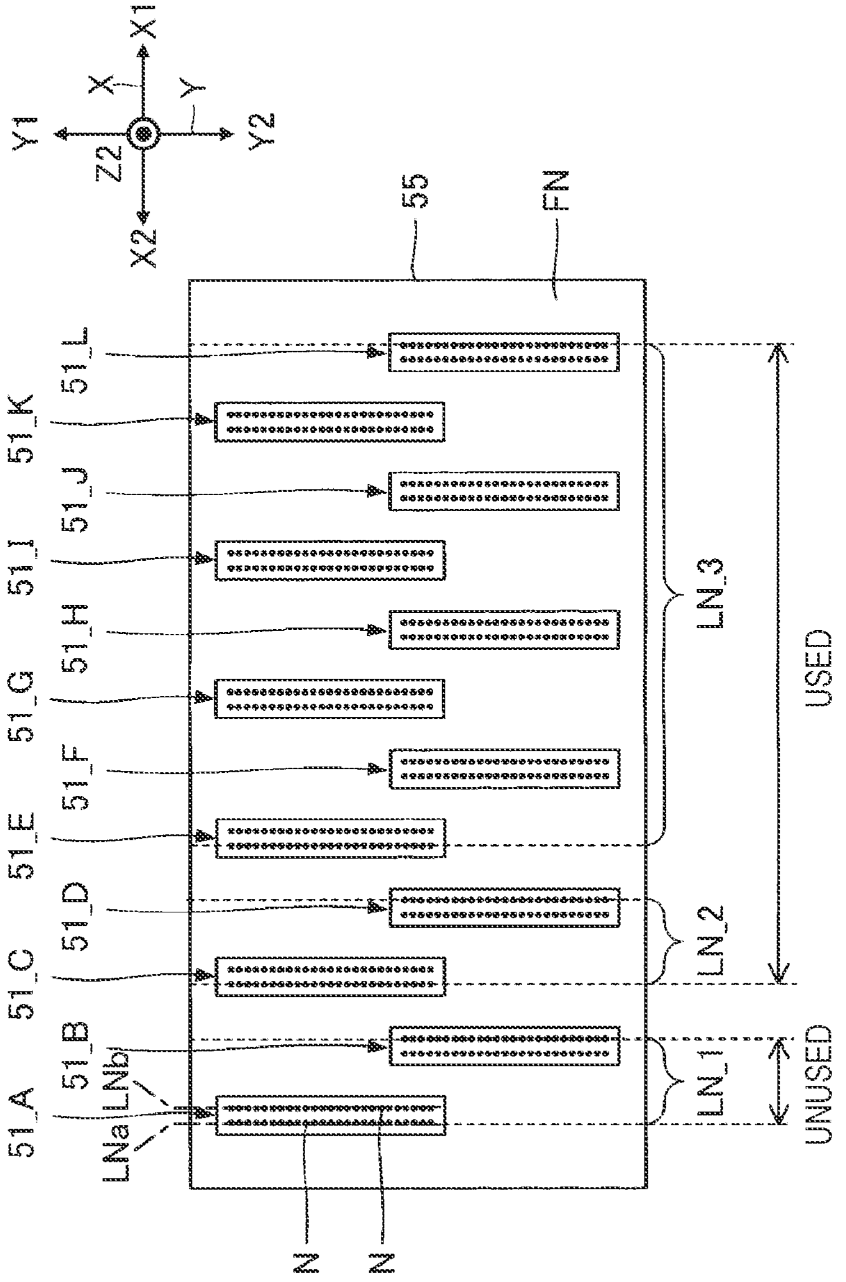
FIG. 10 is a view illustrating an example of used nozzle arrays and an unused nozzle array in a first mode.

FIG. 10 is a view illustrating an example of the used nozzle arrays and the unused nozzle arrays in the first mode MD1. FIG. 10 illustrates a case where the nozzle arrays LNa and LNb of the head chips 51_A and 51_B are unused nozzle arrays in the first mode MD1. That is, in the first mode MD1, as illustrated in FIG. 10, the nozzle arrays LNa and LNb of the head chips 51_C to 51_L are used for the printing operation without using the nozzle arrays LNa and LNb of the head chips 51_A and 51_B.

Here, the nozzle arrays LNa and LNb of the head chips 51_A and 51_B are "first nozzle array LN_1", the nozzle arrays LNa and LNb of the head chips 51_C and 51_D are "second nozzle array LN_2", and the nozzle arrays LNa and LNb of the head chips 51_E to 51_L are a "third nozzle array LN_3". The third nozzle array LN_3 may be the nozzle array LN positioned at a position farther from the first nozzle array LN_1 than the second nozzle array LN_2. That is, the distance between the first nozzle array LN_1 and the third nozzle array LN_3 may be longer than the distance between the first nozzle array LN_1 and the second nozzle array LN_2.

In the first mode MD1 according to the present embodiment, the number of unused nozzle arrays, which are the nozzle arrays LN that are not used for the printing operation in the liquid ejecting head 50, is equal to or greater than the number of the nozzle arrays LN provided on the nozzle plate **51*c*. Specifically, the number of unused nozzle arrays in the first mode MD1 is four, and the number of nozzle arrays LN provided on the nozzle plate 51*c* is two. Then, in the first mode MD1 according to the present embodiment, all the nozzle arrays LN of at least one head chip 51 among the plurality of head chips 51 included in the liquid ejecting head 50** are unused nozzle arrays.

Specifically, all the nozzle arrays LN included in each of the head chips 51_A and 51_B are unused nozzle arrays, and all the nozzle arrays LN included in each of the head chips 51_C to 51_L are used nozzle arrays. Therefore, the unused nozzle and the used nozzle array do not coexist in one head chip 51.

Figure 11:
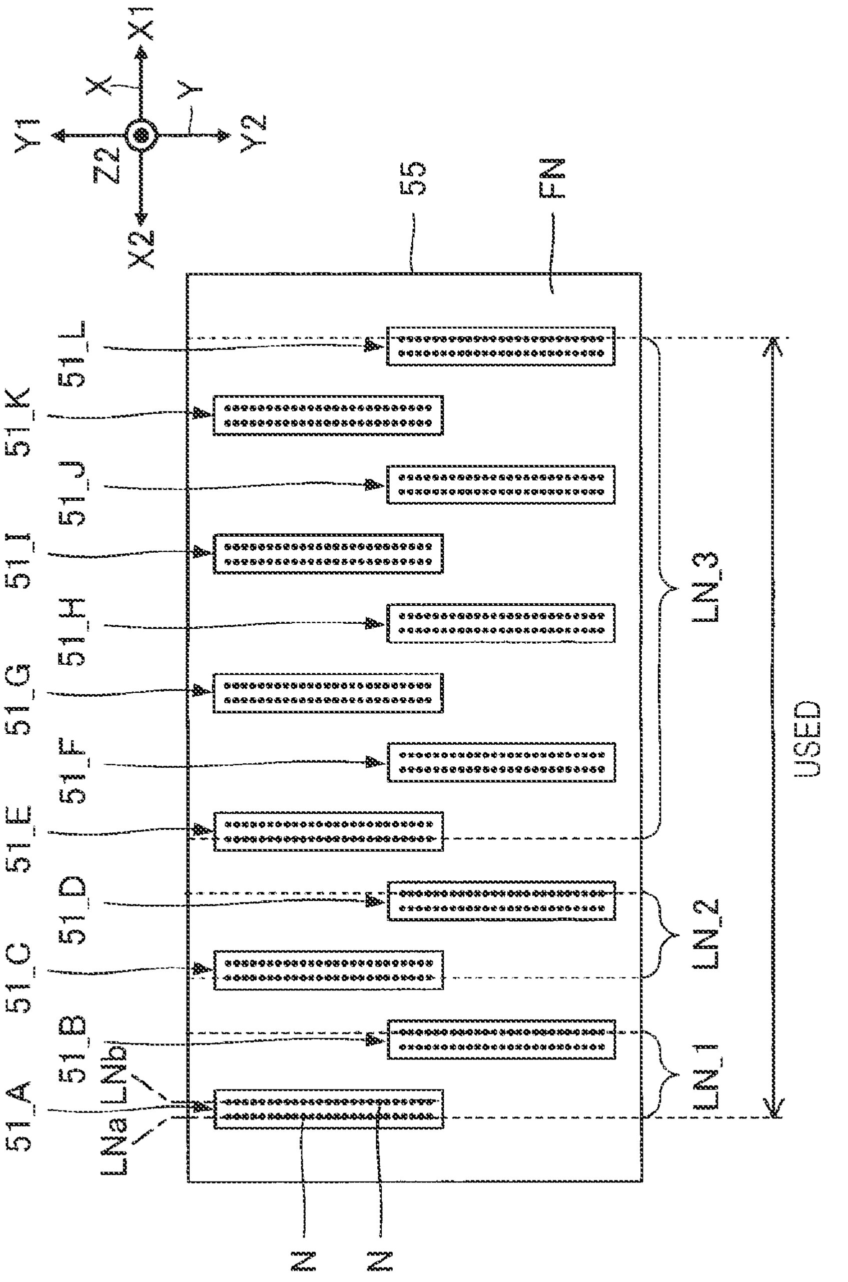
FIG. 11 is a view illustrating an example of used nozzle arrays in a second mode.

FIG. 11 is a view illustrating an example of the used nozzle arrays in the second mode MD2. In the second mode MD2, as illustrated in FIG. 11, all the nozzle arrays LNa and LNb of the head chips 51_A to 51_L are used for the printing operation. That is, in the second mode MD2, all of the first nozzle array LN_1, the second nozzle array LN_2, and the third nozzle array LN_3 are used for the printing operation.

As described above, one of the first mode MD1 and the second mode MD2 is selectively executed based on the mounting state of the liquid storage section 11 with respect to the mounting section 12.

Here, the mist of the ink ejected from the second nozzle array LN_2 and the like used for the printing operation adheres to the part of the ejection surface FN in the vicinity of the first nozzle array LN_1 and is liquidized. The liquidized ink enters the nozzle N of the first nozzle array LN_1 due to the capillary phenomenon. In addition, when the first mode MD1 is selected, the pressure regulating valve 54 is brought into the closed state unless the pressure regulating valve 54 corresponding to the first nozzle array LN_1, which is the unused nozzle array, is forcibly opened. In other words, due to the ink entering the nozzle N of the first nozzle array LN_1 from the outside and the pressure regulating valve 54, the flow path between the nozzle N of the first nozzle array LN_1 and the pressure regulating valve 54 is a closed space that is not open to the atmosphere. Therefore, when the temperature inside the flow path increases as the temperature inside the housing 70 rises, the pressure of the flow path communicating with the first nozzle array LN_1 increases, and the ink entering the first nozzle array LN_1 is discharged from the nozzle N to be dripped down. In this manner, there is a concern that the medium M is contaminated when the printing operation is executed.

Therefore, in order to prevent such contamination of the medium M, in the first mode MD1, when the number of times of discharging the ink and the temperature inside the housing 70 satisfy a predetermined condition, the maintenance of the first nozzle array LN_1 is performed.

1-8. Maintenance in First Mode

Figure 12:
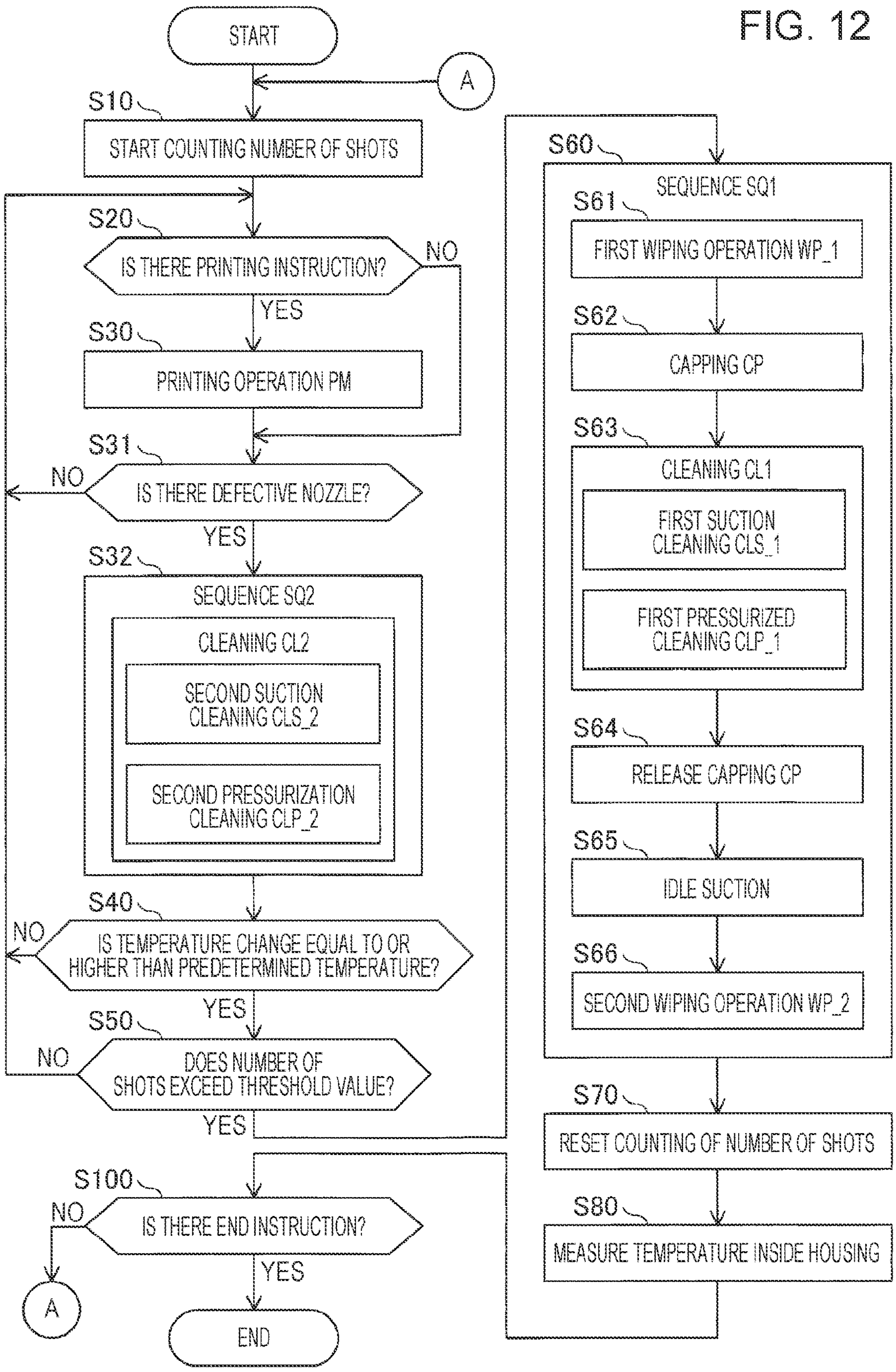
FIG. 12 is a flowchart for describing an operation in the first mode of the liquid ejecting apparatus according to the embodiment.

FIG. 12 is a flowchart for describing an operation of the maintenance mechanism 60. As described above, when the first mode MD1 is selected and the flag FL is set, first, as illustrated in FIG. 12, the control section 21*a* causes the counting section 21*b* to start counting in step 510. As a result, the counting section 21*b* generates and updates the count information Dc in association with the execution of a printing operation PM. The start timing in FIG. 12 is, for example, the timing at which a power ON operation of the liquid ejecting apparatus 100 is performed, or the timing at which the second mode MD2 is selected.

Next, in step 520, the control section 21*a* determines the presence or absence of a printing instruction. When the printing instruction is given (step S20: YES), the control section 21*a* executes the printing operation PM in step 530. In the printing operation PM, as described above, the second nozzle array LN_2 and the third nozzle array LN_3 are used without using the first nozzle array LN_1. In the period other than the execution period of the printing operation PM and the sequences SQ1 and SQ2 which will be described later, the cap mechanism 61 caps the ejection surface FN, if necessary.

After the execution of the printing operation PM, or when there is no printing instruction (step S20: NO), in step S31, the control section 21*a* determines whether or not there is a defective nozzle in the nozzle that forms the used nozzle array.

When there is no defective nozzle (step S31: NO), the control section 21*a* returns to step S20 described above. On the other hand, when there is the defective nozzle (step S31: YES), the control section 21*a* executes the sequence SQ2 in step S32. Details of the sequence SQ2 will be described after the description of the sequence SQ1.

After step S32, in step S40, the control section 21*a* determines whether or not the temperature change inside the housing 70 is equal to or higher than the predetermined temperature. This determination is made based on the measurement signal Dt. The predetermined temperature is, for example, 15° C. Specifically, in the temperature change inside the housing 70, with respect to the temperature measured at the timing at which the previous sequence SQ1 is ended (step S70 which will be described later), it is determined whether or not the temperature inside the housing 70 measured in step S40 rises to be equal to or higher than the predetermined temperature. When the sequence SQ1 was not executed before performing step S40, with respect to the temperature inside the housing 70 measured when the first printing operation PM performed by the liquid ejecting apparatus 100 is started, it may be determined whether or not the temperature inside the housing 70 measured in step S40 rises to be equal to or higher than the predetermined temperature.

When the temperature change inside the housing 70 is lower than the predetermined temperature (step S40: NO), the control section 21*a* returns to step 520. On the other hand, when the temperature change in the housing 70 is equal to or higher than the predetermined temperature (step S40: YES), in step 550, the control section 21*a* determines whether or not the number of shots, which is the counted number indicated by the count information Dc, exceeds the threshold value. Here, the number of shots is preferably the number of shots of ink ejected from the second nozzle array LN_2 that has a greater influence on the first nozzle array LN_1 than the third nozzle array LN_3.

When the counted number indicated by the count information Dc is equal to or less than the threshold value (step 550: NO), the control section 21*a* returns to step 520. On the other hand, when the counted number indicated by the count information Dc exceeds the threshold value (step S50: YES), the control section 21*a* executes the sequence SQ1 in step S60. Here, the control section 21*a* preferably starts the sequence SQ1 based on the number of shots of the ink ejected from the second nozzle array LN_2 which has a greater influence on the first nozzle array LN_1 than the third nozzle array LN_3. In the sequence SQ1, the maintenance of the first nozzle array LN_1 is performed.

Step S60 includes step S61 of executing a first wiping operation WP_1, step S62 of executing capping CP, step S63 of executing cleaning CL1, step S64 of releasing the capping CP, step S65 of executing idle suction, and step S66 of executing a second wiping operation WP_2 in this order. That is, in the sequence SQ1, the first wiping operation WP_1, the capping CP, the cleaning CL1, the release of the capping CP, the idle suction, and the second wiping operation WP_2 are executed in this order.

In each of the first wiping operation WP_1 and the second wiping operation WP_2, the wiping mechanism 63 wipes the ejection surface FN. This wiping will be described later with reference to FIG. 13. Hereinafter, each of the first wiping operation WP_1 and the second wiping operation WP_2 may be referred to as a wiping operation WP.

In the capping CP, the suction cleaning mechanism 62 caps the nozzle arrays LN of the head chips 51_A and 51_B with the cap 62*a*. The capping will be described later with reference to FIG. 14. The capping CP is not performed or is temporarily released when the first pressurization cleaning CLP_1, which will be described later, is executed.

The cleaning CL1 discharges the ink entering the first nozzle array LN_1 from the first nozzle array LN_1. Specifically, the cleaning CL1 executes one or both of a first suction cleaning CLS_1 and a first pressurization cleaning CLP_1. Here, the first suction cleaning CLS_1 is performed in a state where the first nozzle array LN_1 is capped by the cap 62*a*. On the other hand, the first pressurization cleaning CLP_1 is performed in a state where the first nozzle array LN_1 faces the cap 62*a*, that is, in a state where the capping CP is released.

In the first suction cleaning CLS_1, the suction cleaning mechanism 62 executes suction cleaning in which ink is discharged from the first nozzle array LN_1 by suction. The intensity of the first suction cleaning CLS_1 is weaker than the intensity of the second suction cleaning CLS_2 which will be described later. The weak intensity of the suction cleaning means, for example, that the length of the execution period of the suction cleaning is short, the rotation speed of the decompression pump is low, and the like.

In the first pressurization cleaning CLP_1, the liquid supply mechanism 10 executes pressurization cleaning in which ink is discharged from the first nozzle array LN_1 by pressurization. The intensity of the first pressurization cleaning CLP_1 is weaker than the intensity of the second pressurization cleaning CLP_2 which will be described later. The weak intensity of the pressurization cleaning means, for example, that the length of the execution period of the pressurization cleaning is short, the rotation speed of the pressurizing pump is low, and the like. In the pressurization cleaning, unlike flushing in which the ink is discharged from the nozzle array LN by driving the drive element 51*f*, the ink is discharged from the nozzle array LN by using the pressurization mechanism 13 that performs pressurization upstream of the pressure chamber C. Therefore, the nozzle array LN is cleaned. In the pressurization cleaning according to the present embodiment, the ink toward the nozzle array LN is pressurized by using the pressure from the flow path upstream of the pressure regulating valve 54 by forcibly opening the pressure regulating valve 54 by the external force.

After the above-described cleaning CL1, the capping CP is released. Thereafter, in a state where the capping CP is released, idle suction is performed by operating the suction cleaning mechanism 62.

In the above-described sequence SQ1, the second wiping operation WP_2 is executed after the cleaning CL1, and thus the remaining ink seeped from the nozzle N after the cleaning CL1 is removed. Here, the ink adhering to the ejection surface FN is removed by executing the first wiping operation WP_1 before the cleaning CL1. Therefore, execution of the second wiping operation WP_2 prevents ink from entering the unused nozzle array from the ejection surface FN.

After executing the above-described sequence SQ1, in step S70, the control section 21*a* resets the counted number indicated by the count information Dc. For example, the reset is performed by deleting the count information Dc from the storage circuit 22 or rewriting the counted number indicated by the count information Dc to zero.

After executing the above-described sequence SQ1, in step S80, the control section 21*a* measures the temperature inside the housing 70 by acquiring the measurement signal Dt indicating the measured temperature inside the housing 70, and writes the temperature information in the storage circuit 22.

In the period from step S10 to step S80 described above, the control section 21*a* executes the sequence SQ2 at a predetermined timing. The sequence SQ2 is executed in the same manner as the sequence SQ1 except that the maintenance of the second nozzle array LN_2 and the third nozzle array LN_3 is performed. However, in the sequence SQ2, the cleaning CL2 is executed instead of the cleaning CL1. Further, the sequence SQ2 may omit the wiping operation corresponding to the first wiping operation WP_1.

The predetermined timing is a timing having a frequency higher than the execution frequency of the sequence SQ1, and may be an irregular timing or a regular timing. For example, it may be detected whether or not there is a defective nozzle in the used nozzle array each time the printing operation PM is ended, and when there is a defective nozzle, it may be determined that the timing is the predetermined timing, and the sequence SQ2 may be irregularly performed. When the printing operation PM is executed for a predetermined time shorter than the period from step S10 to step S60, it may be determined that the timing is the predetermined timing, and the sequence SQ2 may be periodically performed.

Here, the defective nozzle includes nozzles N in a discharge state, such as a state where ink cannot be discharged due to thickening of the ink in the nozzle N or air bubbles getting into the nozzle N, a state where the designated amount of ink cannot be discharged even when the ink can be discharged, a state where more ink than the designated amount is discharged, and a state where the ink landing position is shifted. For example, when the drive element 51*f* is a piezoelectric element, a method for detecting a defective nozzle uses a piezoelectric element to detect residual vibrations of ink inside the pressure chamber C that occurs when the ink inside the pressure chamber C is oscillated by driving the piezoelectric element. Other known methods can be adopted as the method for detecting the defective nozzle.

The cleaning CL2 executes one or both of the second suction cleaning CLS_2 performed in a state where the second nozzle array LN_2 or the third nozzle array LN_3 is capped by the cap 62*a*, and the second pressurization cleaning CLP_2 performed in a state where the second nozzle array LN_2 or the third nozzle array LN_3 faces the cap 62*a*.

In the second suction cleaning CLS_2, the suction cleaning mechanism 62 executes suction cleaning in which ink is discharged from the second nozzle array LN_2 or the third nozzle array LN_3 by suction. However, in consideration of the suction load due to the ink in the used nozzle array, in the second suction cleaning CLS_2, the suction cleaning mechanism 62 executes the suction cleaning at an intensity stronger than that in the first suction cleaning CLS_1.

In the second pressurization cleaning CLP_2, the liquid supply mechanism 10 executes pressurization cleaning in which ink is discharged from the second nozzle array LN_2 or the third nozzle array LN_3 by pressurization. However, in consideration of the pressurization load due to the ink in the used nozzle array, in the second pressurization cleaning CLP_2, the liquid supply mechanism 10 executes the pressurization cleaning at an intensity stronger than that of the first pressurization cleaning CLP_1.

After step S80, the control section 21*a* determines whether or not there is an end instruction, in step S100. The determination is made depending on whether or not there is a power OFF operation of the liquid ejecting apparatus 100 or whether or not the second mode MD2 is selected.

When there is no end instruction (step S100: NO), the control section 21*a* returns to step 510. On the other hand, when there is the end instruction (step S100: YES), the control section 21*a* ends the processing of the first mode MD1.

Figure 13:
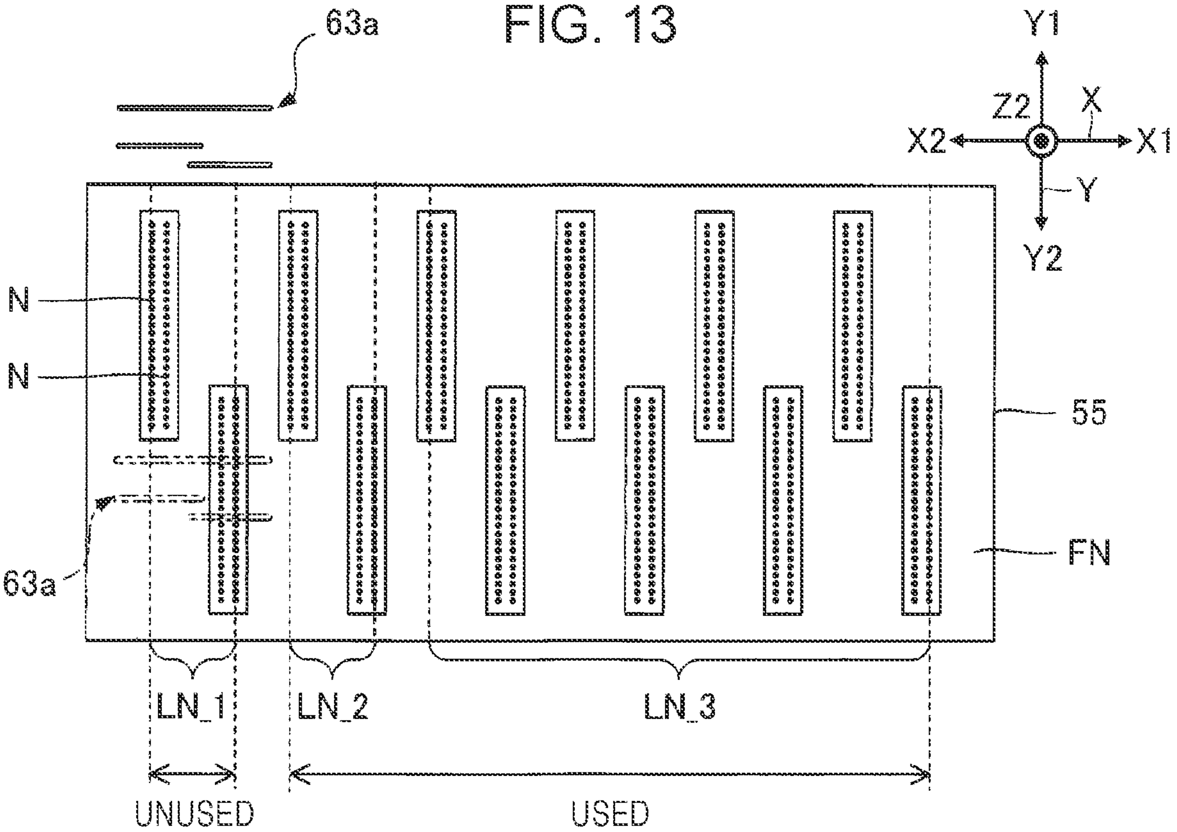
FIG. 13 is a view for describing a wiping operation.

FIG. 13 is a view for describing the wiping operation. In each of the wiping operations WP of the first wiping operation WP_1 and the second wiping operation WP_2 described above, as illustrated in FIG. 13, the wiping member 63*a* wipes the first nozzle array LN_1 by moving in the direction along the Y-axis. Here, in each of the first wiping operation WP_1 and the second wiping operation WP_2, the second nozzle array LN_2 and the third nozzle array LN_3 are not wiped. In other words, in the wiping operation WP, the wiping member 63*a* wipes the region of the first nozzle array LN_1 without wiping the region of the second nozzle array LN_2 in the region of the ejection surface FN. Similarly, in the wiping operation performed in the sequence SQ2, the wiping member 63*a* wipes the region of the second nozzle array LN_2 or the third nozzle array LN_3 without wiping the region of the first nozzle array LN_1 in the region of the ejection surface FN.

Figure 14:
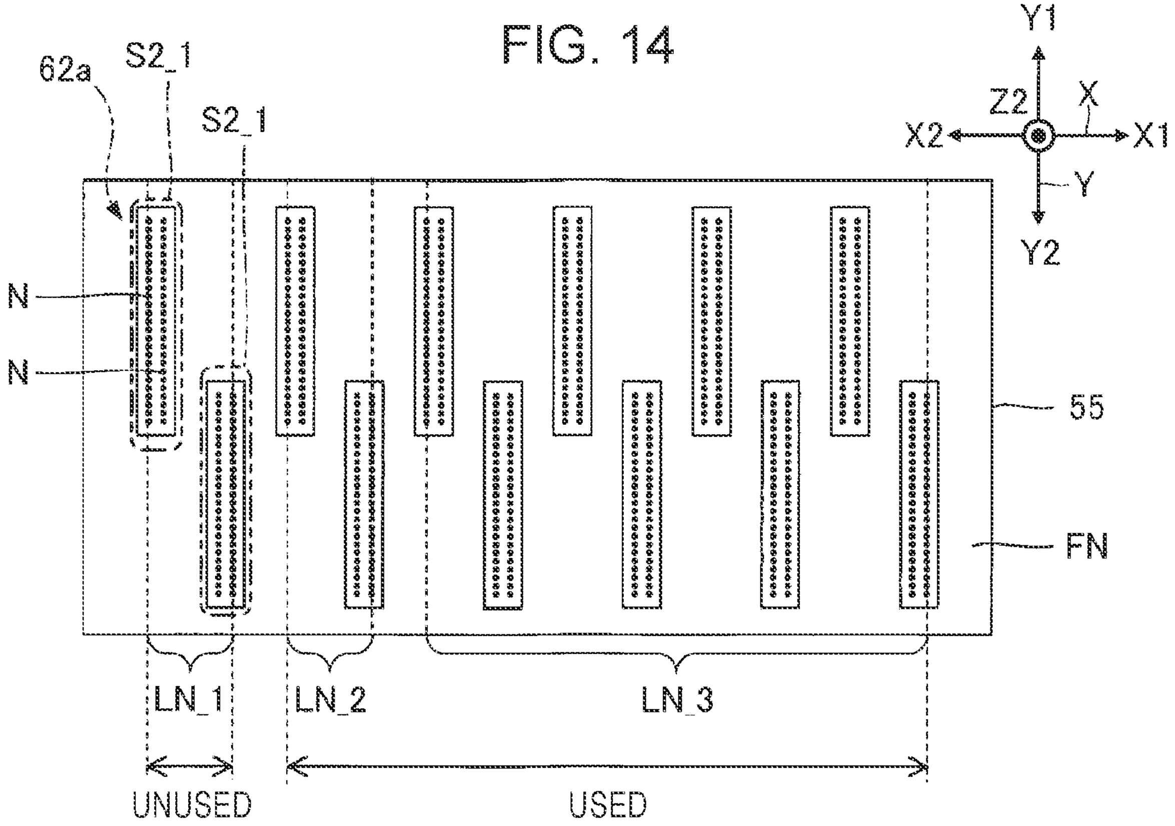
FIG. 14 is a view for describing a cleaning operation on an unused nozzle array.

FIG. 14 is a view for describing a cleaning operation on an unused nozzle array. In the above-described cleaning CL1, the first nozzle array LN_1 is capped by the cap 62*a* as illustrated by the two-dot chain line in FIG. 14 and FIG. 7 described above. Here, the first closed space S2_1 is formed between the recess portion of the cap 62*a* and the ejection surface FN. The first closed space S2_1 is formed by the cap 62*a* coming into contact with the ejection surface FN such that the plurality of nozzles N that constitute the first nozzle array LN_1 are open to the space S2. Here, in the cleaning CL1, capping is not performed on the second nozzle array LN_2 and the third nozzle array LN_3.

Figure 15:
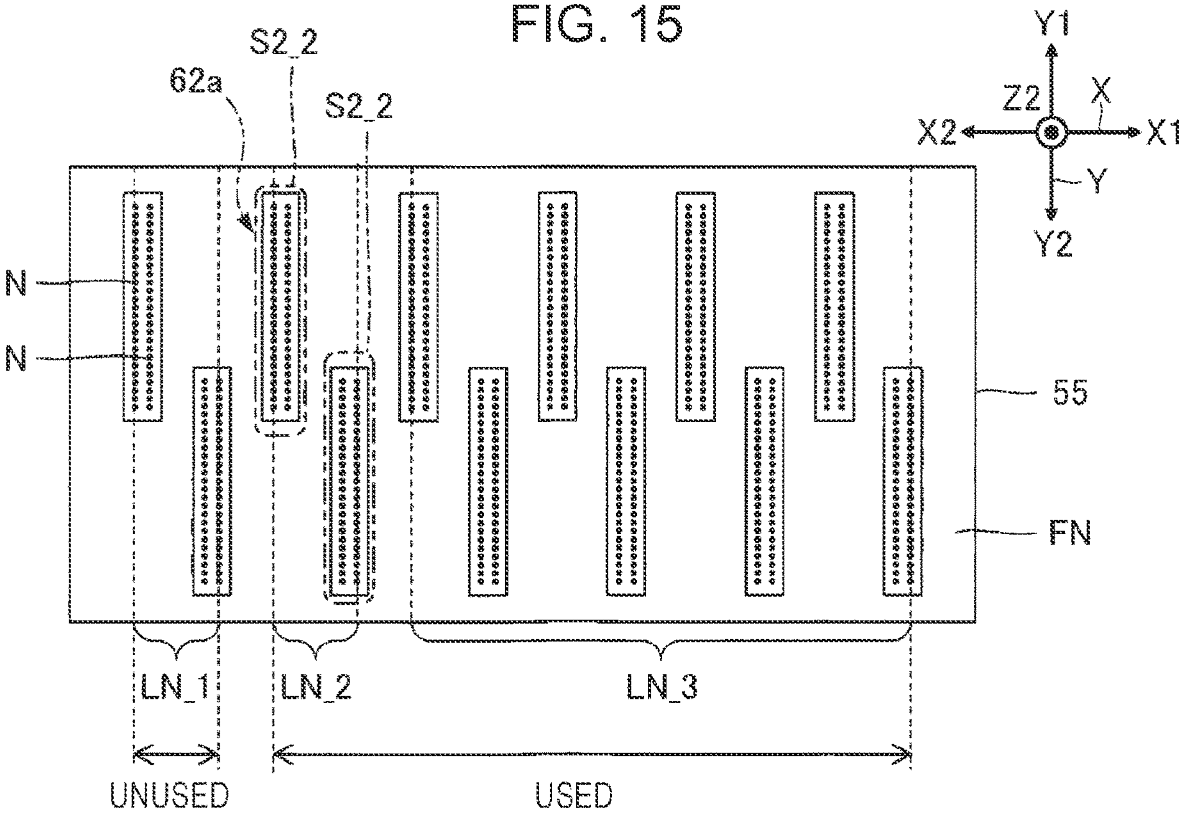
FIG. 15 is a view for describing a cleaning operation on used nozzle arrays.

FIG. 15 is a view for describing the cleaning operation on the used nozzle array. In the above-described cleaning CL2, the second nozzle array LN_2 is capped by the cap 62*a* as illustrated by the two-dot chain line in FIG. 15 and FIG. 8 described above. Here, a second closed space S2_2 is formed at a position different from the position of the first closed space S2_1 between the recess portion of the cap 62*a* and the ejection surface FN. The second closed space S2_2 is formed by the cap 62*a* coming into contact with the ejection surface FN such that the plurality of nozzles N that constitute the second nozzle array LN_2 are open to the space S2. In this manner, the suction cleaning of the second nozzle array LN_2 is individually performed by using the cap 62*a* common to the suction cleaning of the first nozzle array LN_1. Therefore, the second suction cleaning CLS_2 is executed in a period different from the period of the first suction cleaning CLS_1.

Although the state of the suction cleaning of the second nozzle array LN_2 is illustrated in FIG. 15 and FIG. 8 described above, the suction cleaning of the third nozzle array LN_3 is also performed in the same manner as the suction cleaning of the second nozzle array LN_2 except that the position of the space S2, which is the closed space, is different. Here, in the suction cleaning of the third nozzle array LN_3, the plurality of nozzles N that constitute the third nozzle array LN_3 are open to the corresponding closed space.

As described above, the above-described liquid ejecting apparatus 100 includes the liquid ejecting head 50, the liquid storage section 11, and the control section 21*a*. The liquid ejecting head 50 has the ejection surface FN provided with the plurality of nozzle arrays LN that can execute a printing operation of ejecting ink, which is an example of a "liquid", toward the medium M. The liquid storage section 11 stores the ink to be supplied to the liquid ejecting head 50. The control section 21*a* can execute a printing operation.

The plurality of nozzle arrays LN provided on the ejection surface FN include the first nozzle array LN_1 and the second nozzle array LN_2. When the liquid storage section 11 is not coupled to the first nozzle array LN_1 and is coupled to the second nozzle array LN_2, the control section 21*a* can execute the first mode MD1 in which the second nozzle array LN_2 is used for the printing operation without using the first nozzle array LN_1. Further, when the first mode MD1 can be executed, the control section 21*a* executes the sequence SQ1 including the cleaning CL1 for discharging the ink entering the first nozzle array LN_1 from the first nozzle array LN_1.

In the above-described liquid ejecting apparatus 100, when the first mode MD1 can be executed, the ink entering the first nozzle array LN_1 is discharged from the first nozzle array LN_1 by executing the sequence SQ1 including the cleaning CL1. Therefore, even when the first nozzle array LN_1, which is the unused nozzle array in the first mode MD1, is not closed, the ink entering the first nozzle array LN_1 is prevented from dripping on the medium M. In this manner, since it is not necessary to close the first nozzle array LN_1, which is the unused nozzle array in the first mode MD1, it is not necessary to separately manufacture the liquid ejecting apparatus including the liquid ejecting head of which the unused nozzle array is closed, and the liquid ejecting apparatus 100 including the liquid ejecting head 50 that does not have a closed nozzle array such that all the nozzle arrays LN can be used, and it is not necessary to manage the liquid ejecting apparatuses in inventory. That is, the liquid ejecting apparatus 100 according to the present embodiment can execute the printing operation in which only some of the plurality of nozzle arrays LN provided in the liquid ejecting head 50 is used as in the first mode MD1, and the printing operation in which all of the plurality of nozzle arrays LN included in the liquid ejecting head 50 are used as in the second mode MD2. As a result, the cost of the liquid ejecting apparatus 100 can be reduced.

In the present embodiment, as described above, the cleaning CL1 includes the first suction cleaning CLS_1 in which the ink is discharged from the first nozzle array LN_1 by suction. When the cleaning CL1 is the first suction cleaning CLS_1, the control section 21*a* can execute the second suction cleaning CLS_2 in which the ink is discharged from the second nozzle array LN_2 by suction. The intensity of the first suction cleaning CLS_1 is weaker than the intensity of the second suction cleaning CLS_2. Since the amount of ink entering the nozzle N of the unused nozzle array is less than the amount of ink discharged from the nozzle N required to recover the defective nozzle included in the used nozzle array in the sequence SQ2, the ink can be discharged without excess or deficiency in each of the first suction cleaning CLS_1 and the second suction cleaning CLS_2. As a result, the life of the decompression pump of the decompression mechanism 62*d* used for these suction cleanings can be extended, and the execution time of the sequence SQ1 can be shortened.

In addition, as described above, the liquid ejecting apparatus 100 further includes the cap 62*a* and the decompression mechanism 62*d*. The cap 62*a* can form a closed space with the ejection surface FN by coming into contact with the ejection surface FN. The decompression mechanism 62*d* is a mechanism for decompressing the closed space. Moreover, when the first suction cleaning CLS_1 is executed, the cap 62*a* forms the closed space as the first closed space S2_1 to which the plurality of nozzles N that constitute the first nozzle array LN_1 are open. Further, when the second suction cleaning CLS_2 is executed, the cap 62*a* forms the closed space at the position different from the position of the first closed space S2_1 as the second closed space S2_2 to which the plurality of nozzles N that constitute the second nozzle array LN_2 are open. Then, the control section 21*a* executes the first suction cleaning CLS_1 and the second suction cleaning CLS_2 in periods different from each other.

As described above, since the common cap 62*a* is used by the first nozzle array LN_1 which is an unused nozzle array in the first mode MD1 and the second nozzle array LN_2 which is a used nozzle array in the first mode MD1, the size and the cost of the liquid ejecting apparatus 100 can be reduced. Here, even when the first suction cleaning CLS_1 and the second suction cleaning CLS_2 are individual, by determining whether or not to execute the sequence SQ1 based on the number of shots of the ink ejected from the nozzle array LN, the decrease in throughput can be reduced. As described above, since the number of the head chips 51 is greater than the number of the caps 62*a*, it is not possible to execute maintenance on both the used nozzle array and the unused nozzle array at the same time, but the decrease in throughput can be reduced.

Furthermore, as described above, the cleaning CL1 includes the first pressurization cleaning CLP_1 in which the ink is discharged from the first nozzle array LN_1 by pressurization. When the cleaning CL1 is the first pressurization cleaning CLP_1, the control section 21*a* can execute the second pressurization cleaning CLP_2 in which the ink is discharged from the second nozzle array LN_2 by pressurization. The intensity of the first pressurization cleaning CLP_1 is weaker than the intensity of the second pressurization cleaning CLP_2. Therefore, the ink can be discharged without excess or deficiency in each of the first pressurization cleaning CLP_1 and the second pressurization cleaning CLP_2. As a result, the life of the pressurizing pump of the pressurization mechanism 13 used for the pressurization cleaning can be extended, or the execution time of the sequence can be shortened.

In addition, as described above, the liquid ejecting apparatus 100 further includes the wiping member 63*a*. The wiping member 63*a* can wipe the ejection surface FN. The sequence SQ1 includes a wiping operation of wiping the region of the first nozzle array LN_1 without wiping the region of the second nozzle array LN_2 in the region of the ejection surface FN by the wiping member 63*a*. Therefore, since the region of the second nozzle array LN_2, which is the used nozzle array, is not wiped more than necessary, even when a surface treatment such as a liquid repellent film is applied to the ejection surface FN, deterioration of the surface treatment can be reduced. As a result, since it is possible to reduce the adhesion of mist generated from the used nozzle array during the recording operation to the ejection surface FN, the case where the ink, which is mist liquidized on the ejection surface FN, entered the nozzle N of the first nozzle array LN_1, which is an unused nozzle array in the first mode MD1, and the case where the ink adhering to the region of the first nozzle array LN_1 on the ejection surface FN adheres to the medium M during the printing operation, are reduced. Further, the size and the cost of the liquid ejecting apparatus 100 can be reduced as compared with an aspect in which the entire ejection surface FN is wiped at one time.

Furthermore, as described above, the control section 21*a* starts the sequence SQ1 based on the number of shots of the ink ejected from the second nozzle array LN_2. Therefore, based on the number of shots, the adhesion amount of mist adhering to the region of the first nozzle array LN_1, which is an unused nozzle array on the ejection surface FN in the first mode MD1 is predicted. Based on the prediction result, the execution frequency of the sequence SQ1 can be reduced to the necessary and sufficient extent. Therefore, the ink can be eliminated from the region of the first nozzle array LN_1 before the ink drips from the region of the first nozzle array LN_1, which is an unused nozzle array in the first mode MD1. Here, as described above, the count of the number of shots is reset each time the sequence SQ1 is executed. When the sequence SQ1 is performed for the first time, the counting of the number of shots is started from the printing operation first performed by a printer. In addition, the number of shots may be the total number of shots of the used nozzle array, and in that case, not only the second nozzle array LN_2 but also the third nozzle array LN_3 are examples of the “second nozzle array”.

Further, as described above, the plurality of nozzle arrays LN provided on the ejection surface FN further include the third nozzle array LN_3. The distance between the first nozzle array LN_1 and the third nozzle array LN_3 is longer than the distance between the first nozzle array LN_1 and the second nozzle array LN_2. The first mode MD1 uses the third nozzle array LN_3 for the printing operation PM when the liquid storage section 11 is coupled to the third nozzle array LN_3. The control section 21*a* starts the sequence SQ1 based on the number of shots of the ink ejected from the second nozzle array LN_2. Therefore, based on the number of shots, the adhesion amount of mist adhering to the vicinity of the region of the first nozzle array LN_1, which is an unused nozzle array on the ejection surface FN in the first mode MD1 is accurately predicted. Based on the prediction result, the execution frequency of the sequence SQ1 can be reduced to the necessary and sufficient extent. Therefore, the ink can be more reliably eliminated from the first nozzle array LN_1 before the ink drips from the first nozzle array LN_1, which is an unused nozzle array in the first mode MD1.

Here, when the liquid ejecting head 50 includes the head chip 51 of only the unused nozzle array, the sequence SQ1 is performed based on the number of shots of the nozzle array LN, which is the used nozzle array of the head chip 51 adjacent to the head chip 51 of only the unused nozzle array. In addition, when the used nozzle array and the unused nozzle array coexist in one head chip 51, the sequence is performed based on the number of shots of the used nozzle array of the one head chip 51 and the number of shots of the used nozzle array of the head chip 51 adjacent to the one head chip 51.

Furthermore, as described above, the control section 21*a* can switch the first mode MD1 and the second mode MD2 in which the first nozzle array LN_1 is used for the printing operation PM when the liquid storage section 11 is coupled to the first nozzle array LN_1. Therefore, the specification of the presence or absence of the unused nozzle array can be changed according to the request of the customer.

Further, as described above, the control section 21*a* executes the sequence SQ1 when the first mode MD1 is selected, and does not execute the sequence SQ1 when the second mode MD2 is selected. Therefore, even when the first mode MD1 is selected, it is possible to prevent ink dripping from the first nozzle array LN_1, which is an unused nozzle array in the first mode MD1. Here, by setting the flag FL, the control section 21*a* measures, stores, and determines the number of shots from the used nozzle array, and determines whether or not to start the sequence SQ1 based on the determination result.

Furthermore, as described above, the liquid ejecting apparatus 100 further includes the mounting section 12 in which the liquid storage section 11 can be mounted. The control section 21*a* selects one of the first mode MD1 and the second mode MD2 based on the mounting state of the liquid storage section 11 on the mounting section 12. Therefore, even when there is no instruction of the user, the control section 21*a* can change the specification of the presence or absence of the unused nozzle array based on the mounting state. Further, the flag FL of the sequence SQ1 can be automatically set. The mounting state includes a state of whether or not the liquid storage section 11 mounted on the mounting section 12 is dummy, in addition to a state of whether or not the liquid storage section 11 is mounted on the mounting section 12.

In addition, as described above, the liquid ejecting head 50 has a plurality of head chips 51. Each of the plurality of head chips 51 has the nozzle plate 51*c* provided with the plurality of nozzle arrays LN. In the first mode MD1, the number of unused nozzle arrays, which are the nozzle arrays LN that are not used for the printing operation PM in the liquid ejecting head 50, is equal to or greater than the number of the nozzle arrays LN provided on one nozzle plate 51*c*. In the first mode MD1, all the nozzle arrays LN of at least one head chip 51 among the plurality of head chips 51 included in the liquid ejecting head 50 are unused nozzle arrays. Therefore, the unused nozzle array and the used nozzle array do not coexist in one head chip 51, and thus it is not necessary to use a cap for each nozzle array LN, and even when the cap 62*a* for each head chip 51 is used, it is possible to avoid a phenomenon in which a negative pressure does not act on the used nozzle array when executing the first suction cleaning CLS_1. The number of nozzle arrays LN provided on one nozzle plate 51*c* may be one.

Furthermore, as described above, the liquid ejecting head 50 has a plurality of introduction sections 53 for introducing the ink from the outside of the liquid ejecting head 50. When the first mode MD1 is executed, the plurality of introduction sections 53 include the introduction section 53_1, which is an example of a "first introduction section" that communicates with the first nozzle array LN_1 but does not supply ink to the first nozzle array LN_1, and the introduction section 53_2, which is an example of a "second introduction section" that supplies the liquid to the second nozzle array LN_2. Here, the fact that "the introduction section 53 communicates with the nozzle array LN" includes not only a state where the introduction section 53 and the nozzle array LN constantly communicate with each other, but also a state where the introduction section 53 and the nozzle array LN are coupled to each other via a mechanism such as the pressure regulating valve 54 that can be opened and closed, and the introduction section 53 and the nozzle array LN communicate with each other when desired by the operation of the mechanism, and does not include a state where the introduction section 53 is blocked by an adhesive.

In addition, as described above, the liquid ejecting apparatus 100 further includes the pressure regulating valve 54_1. The pressure regulating valve 54_1 communicates with the first nozzle array LN_1 and opens when the pressure of the first nozzle array LN_1 is less than a predetermined pressure. In the aspect of using the pressure regulating valve 54_1, when the first nozzle array LN_1 is an unused nozzle array, the flow path communicating with the first nozzle array LN_1 is not opened to the atmosphere unless the pressure regulating valve 54_1 is forcibly opened. Therefore, when the ink remains in the region of the first nozzle array LN_1 in the region of the ejection surface FN, the ink entering the first nozzle array LN_1 is pushed out due to the pressure fluctuation due to the temperature change of the flow path. As a result, ink dripping is likely to occur. Therefore, the effect of the present disclosure becomes remarkable in a case of such an aspect. When the first nozzle array LN_1 is the used nozzle array, the pressure of the first nozzle array LN_1 is maintained to be a negative pressure in a predetermined range by opening and closing the pressure regulating valve 54_1 such that the meniscus of the ink of the nozzle N of the first nozzle array LN_1 is in the desired state.

Further, the technique of the present disclosure is preferably used when the ink ejected by the second nozzle array LN_2 is water-based ink. When the water-based ink remains on the ejection surface FN, it is likely to cause ink dripping in the first nozzle array LN_1. Therefore, the effect of the present disclosure is remarkable when the water-based ink is used.

In addition, as described above, the liquid ejecting apparatus 100 further includes the housing 70 that accommodates the liquid ejecting head 50. The control section 21*a* determines whether or not to execute the sequence SQ1 based on the temperature change in the housing 70. Therefore, since the sequence SQ1 is performed when necessary based on the temperature change in the housing 70, the sequence SQ1 does not need to be wastefully performed.

Furthermore, as described above, when the first mode MD1 is executed, the control section 21*a* executes the sequence SQ1 in a period different from the cleaning CL2 in which ink is discharged from the second nozzle array LN_2.

2. MODIFICATION EXAMPLE

Each aspect exemplified above can be variously modified. Specific modifications will be described below. Two or more aspects selected in any manner from the following examples can be appropriately combined with each other within a range of not being inconsistent with each other.

2-1. Modification Example 1

In the above-described embodiment, the aspect in which the unused nozzle array in the first mode MD1 is the nozzle array LN of the head chips 51_A and 51_B is exemplified, but the arrangement and the number of unused nozzle arrays are not limited to this aspect, and are selected in any desired way. In addition, the arrangement and the number of unused nozzle arrays may change depending on the mounting state of the liquid storage section 11 with respect to the mounting section 12.

Figure 16:
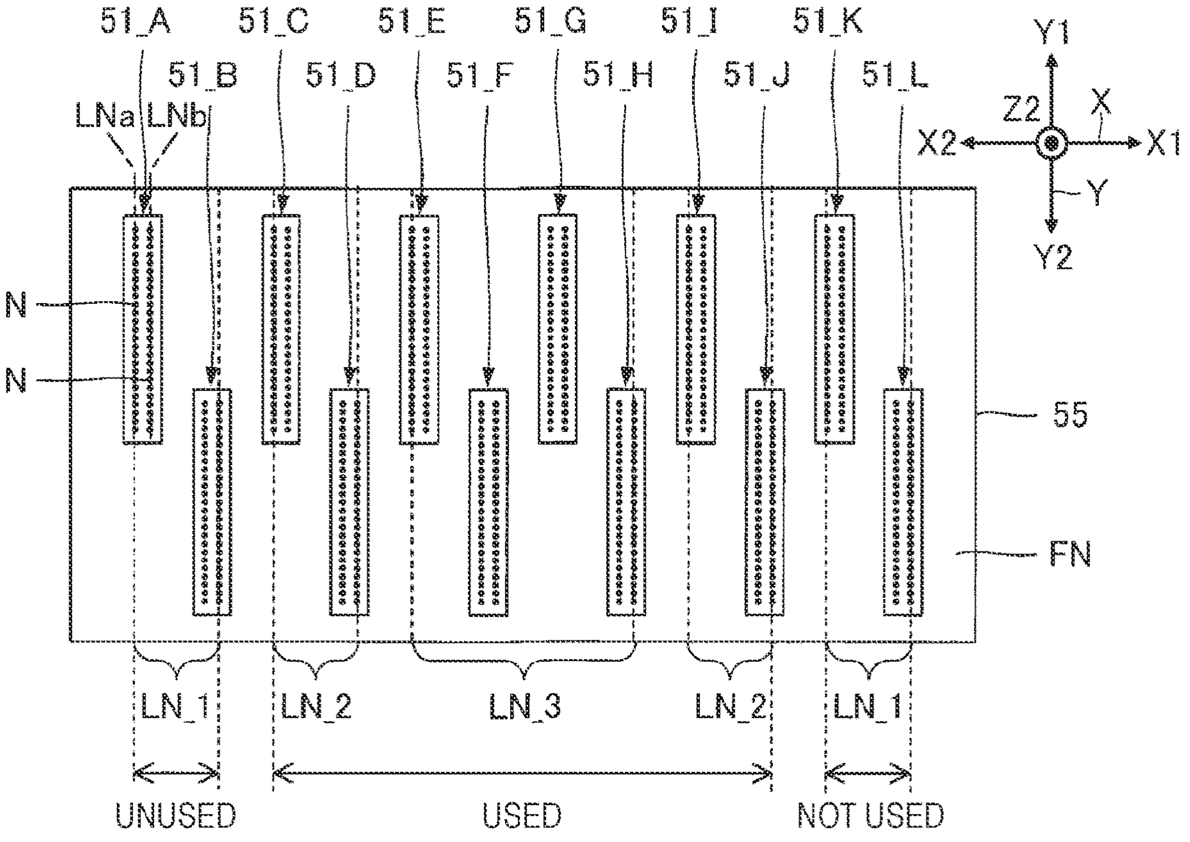
FIG. 16 is a view illustrating another example of used nozzle arrays and an unused nozzle array in the first mode.

FIG. 16 is a view illustrating another example of the used nozzle arrays and the unused nozzle arrays in the first mode MD1. FIG. 16 illustrates a case where the nozzle arrays LNa and LNb of the head chips 51_A, 51_B, 51_K, and 51_L are unused nozzle arrays in the first mode MD1. That is, in the example illustrated in FIG. 16, in the first mode MD1, the nozzle arrays LNa and LNb of the head chips 51_C to 51_J are used for the printing operation without using the nozzle arrays LNa and LNb of the head chips 51_A, 51_B, 51_K, and 51_L.

Here, the nozzle arrays LNa and LNb of the head chips 51_A, 51_B, 51_K, and 51_L are "first nozzle arrays LN_1", the nozzle arrays LNa and LNb of the head chips 51_C, 51_D, 51_I, and 51_J are "second nozzle arrays LN_2", and the nozzle arrays LNa and LNb of the head chips 51_E to 51_H are "third nozzle arrays LN_3".

2-2. Modification Example 2

In the above-described embodiment, the aspect using the temperature sensor 71 is exemplified, but the present disclosure is not limited to this aspect, and the temperature sensor 71 may be omitted. In this case, the above-described step S40 is omitted in the first mode MD1.

2-3. Modification Example 3

In the above-described embodiment, an aspect in which both the suction cleaning and the pressurization cleaning can be executed is exemplified, but the present disclosure is not limited to this aspect, and one of the suction cleaning and the pressurization cleaning may be omitted.

2-4. Modification Example 4

In the above-described embodiment, an aspect in which the wiping mechanism 63 that executes the wiping operation is provided is exemplified, but the present disclosure is not limited to this aspect, and the wiping mechanism 63 may be omitted. Further, the present disclosure is not limited to the aspect in which both the first wiping operation WP_1 and the second wiping operation WP_2 are executed, and for example, the first wiping operation WP_1 may be omitted.

2-5. Modification Example 5

In the above-described embodiment, an aspect in which it is determined whether or not to start the sequence SQ1 based on the number of shots of the ink from the liquid ejecting head 50 is exemplified, but the present disclosure is not limited to this aspect, and for example, regardless of the number of shots, the sequence SQ1 may be executed at each predetermined time or every time the printing operation is executed on a predetermined number of media M.

2-6. Modification Example 6

In the above-described embodiment, an aspect using the pressure regulating valve 54 is exemplified, but the present disclosure is not limited to this aspect, and the pressure regulating valve 54 may be omitted.

2-7. Modification Example 7

In the above-described embodiment, the flow path communicating with the unused nozzle array may be opened to the atmosphere by forcibly bringing the pressure regulating valve 54 corresponding to the unused nozzle array into the open state. Accordingly, since the rise in the pressure of the flow path due to a temperature change is reduced, the ink drawn from the ejection surface FN into the unused nozzle array is prevented from dripping down from the unused nozzle array. In a state where a power supply of the liquid ejecting apparatus 100 is turned on, it is preferable that the pressure regulating valve 54 corresponding to the unused nozzle array is always forcibly brought into the open state. However, during capping in which there is no problem even when ink drips from unused nozzle arrays, the pressure regulating valve 54 may not be forcibly brought into the open state.

2-8. Modification Example 8

In the above-described embodiment, an aspect in which one of the first mode MD1 and the second mode MD2 is selected based on the mounting state of the liquid storage section 11 on the mounting section 12 is exemplified, but the present disclosure is not limited to this aspect. For example, based on an input result to an input section such as an operation panel or a graphical user interface (GUI) that can receive an input of specifications of a used nozzle array and an unused nozzle array in a plurality of nozzle arrays LN included in the liquid ejecting head 50, one of the first mode MD1 and the second mode MD2 may be selected.

2-9. Modification Example 9

The liquid ejecting apparatus 100 exemplified in the above-described embodiments can be adopted in various devices such as a facsimile machine and a copier, in addition to a device dedicated to printing. However, the application of the liquid ejecting apparatus according to the present disclosure is not limited to printing. For example, the liquid ejecting apparatus for ejecting a solution of a coloring material or a dispersing liquid is used as a manufacturing apparatus that forms a color filter of a liquid crystal display apparatus. Further, the liquid ejecting apparatus that ejects a solution of a conductive material or a dispersing liquid is used as a manufacturing apparatus that forms wiring or electrodes on the wiring substrate.

What is claimed is:

1. A liquid ejecting apparatus comprising:

a liquid ejecting head having an ejection surface provided with nozzle arrays and configured to execute a printing operation of ejecting a liquid toward a medium;

a liquid storage section storing the liquid to be supplied to the liquid ejecting head; and a control section configured to execute the printing operation, wherein the nozzle arrays include a first nozzle array and a second nozzle array, when the liquid storage section is not coupled to the first nozzle array and is coupled to the second nozzle array, the control section is configured to execute a first mode in which the second nozzle array is used without using the first nozzle array for the printing operation, and when the first mode is executable, the control section executes a sequence including cleaning in which the liquid entering the first nozzle array is discharged from the first nozzle array.

2. The liquid ejecting apparatus according to claim 1, wherein the cleaning is first suction cleaning in which the liquid is discharged from the first nozzle array by suction, the control section is configured to execute second suction cleaning in which the liquid is discharged from the second nozzle array by suction, and an intensity of the first suction cleaning is weaker than an intensity of the second suction cleaning.

3. The liquid ejecting apparatus according to claim 2, further comprising:

a cap configured to form a closed space with the ejection surface by coming into contact with the ejection surface; and a decompression mechanism for decompressing the closed space, wherein the cap forms the closed space as a first closed space to which nozzles that constitute the first nozzle array are open when the first suction cleaning is executed, and forms the closed space at a position different from a position of the first closed space as a second closed space to which nozzles that constitute the second nozzle array are open when the second suction cleaning is executed, and the control section executes the first suction cleaning and the second suction cleaning in periods different from each other.

4. The liquid ejecting apparatus according to claim 1, wherein the cleaning is first pressurization cleaning in which the liquid is discharged from the first nozzle array by pressurization, the control section is configured to execute second pressurization cleaning in which the liquid is discharged from the second nozzle array by pressurization, and an intensity of the first pressurization cleaning is weaker than an intensity of the second pressurization cleaning.

5. The liquid ejecting apparatus according to claim 1, further comprising:

a wiping member configured to wipe the ejection surface, wherein the sequence includes a wiping operation of wiping a region of the first nozzle array without wiping a region of the second nozzle array in a region of the ejection surface by the wiping member.

6. The liquid ejecting apparatus according to claim 1, wherein the control section starts the sequence based on the number of shots of the liquid ejected from the second nozzle array.

7. The liquid ejecting apparatus according to claim 1, wherein the nozzle arrays further include a third nozzle array, a distance between the first nozzle array and the third nozzle array is longer than a distance between the first nozzle array and the second nozzle array, the first mode uses the third nozzle array for the printing operation when the liquid storage section is coupled to the third nozzle array, and the control section starts the sequence based on the number of shots of the liquid ejected from the second nozzle array.

8. The liquid ejecting apparatus according to claim 1, wherein the control section is configured to switch between the first mode and a second mode in which the first nozzle array is used for the printing operation when the liquid storage section is coupled to the first nozzle array.

9. The liquid ejecting apparatus according to claim 8, wherein the control section executes the sequence when the first mode is selected, and does not execute the sequence when the second mode is selected.

10. The liquid ejecting apparatus according to claim 9, further comprising:

a mounting section configured to mount the liquid storage section thereon, wherein the control section selects one of the first mode and the second mode based on a mounting state of the liquid storage section on the mounting section.

11. The liquid ejecting apparatus according to claim 1, wherein the liquid ejecting head has head chips, each of the head chips has a nozzle plate provided with one or more nozzle arrays, in the first mode, the number of unused nozzle arrays which are nozzle arrays that are not used for the printing operation in the liquid ejecting head is equal to or greater than the number of nozzle arrays provided on one nozzle plate, and in the first mode, all nozzle arrays of at least one head chip among the head chips are the unused nozzle arrays.

12. The liquid ejecting apparatus according to claim 1, wherein the liquid ejecting head includes introduction sections for introducing the liquid from an outside of the liquid ejecting head, and when the first mode is executed, the introduction sections include a first introduction section that communicates with the first nozzle array but does not supply the liquid to the first nozzle array, and a second introduction section that supplies the liquid to the second nozzle array.

13. The liquid ejecting apparatus according to claim 12, further comprising:

a pressure regulating valve that communicates with the first nozzle array and is opened when a pressure of the first nozzle array is less than a predetermined pressure.

14. The liquid ejecting apparatus according to claim 1 wherein the liquid ejected by the second nozzle array is water-based ink.

15. The liquid ejecting apparatus according to claim 1, further comprising:

a housing that accommodates the liquid ejecting head, wherein the control section determines whether or not to execute the sequence based on a temperature change in the housing.

16. The liquid ejecting apparatus according to claim 1 wherein when the first mode is executed, the control section executes the sequence in a period different from a period of cleaning in which the liquid is discharged from the second nozzle array.

* * * * *